(12) United States Patent
Easley et al.

(10) Patent No.: US 8,924,288 B1
(45) Date of Patent: Dec. 30, 2014

(54) SYSTEM AND METHOD FOR AUTOMATED ELECTRONIC SWITCHING OF CUSTOMER SELECTED FINANCIAL TRANSACTIONS FOR A CUSTOMER BANKING ACCOUNT

(75) Inventors: Jeffrey Walton Easley, San Antonio, TX (US); Teddy Joseph Edmond Voutour, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/782,335

(22) Filed: Jul. 24, 2007

(51) Int. Cl.
*G06Q 40/00* (2012.01)

(52) U.S. Cl.
USPC ................................. 705/40; 705/35; 705/39

(58) Field of Classification Search
CPC ..................................................... G06Q 20/106
USPC ..................................................... 705/35–45
See application file for complete search history.

(56) References Cited

U.S. PATENT DOCUMENTS

| | | | |
|---|---|---|---|
| 5,669,528 A * | 9/1997 | Romero et al. | 222/53 |
| 5,699,528 A * | 12/1997 | Hogan | 705/40 |
| 5,913,202 A * | 6/1999 | Motoyama | 705/36 R |
| 6,871,220 B1 | 3/2005 | Rajan et al. | |
| 2003/0225688 A1 * | 12/2003 | Dobbins | 705/39 |
| 2004/0034594 A1 * | 2/2004 | Thomas et al. | 705/39 |
| 2004/0193537 A1 * | 9/2004 | Knapp | 705/39 |
| 2005/0021456 A1 * | 1/2005 | Steele et al. | 705/39 |
| 2006/0106696 A1 * | 5/2006 | Carlson et al. | 705/35 |
| 2006/0116949 A1 * | 6/2006 | Wehunt et al. | 705/35 |

OTHER PUBLICATIONS

About Yodlee, Press Room, Yodlee Inc., [online], [retrieved from the internet on Jun. 14, 2007 using <URL: http://corporate.yodlee.com/company/press_room/previous/2006/09/onlinebillpay.html>.
Intuit CustomerCentral AccountSwitch, Intuit Inc. [online], [retrieved from the Internet on Jul. 19, 2007 using <URL: http://customercentral.intuit.com/prodsvc/accountswitch.shtml >.

* cited by examiner

*Primary Examiner* — Robert R Niquette
*Assistant Examiner* — Chia Yi Liu
(74) *Attorney, Agent, or Firm* — Fish & Richardson P.C.

(57) ABSTRACT

The present disclosure provides a relatively automated system and method for a customer to change to a new service provider of a financial product, such as banking services. In general, the customer may provide initial data to a new second provider that the second provider may use to automatically and electronically access data about the customer from a prior first provider data source, such as an electronic database of the first provider. The customer data may include a customer credential provided to the second provider to retrieve automated financial transactions from the first provider's Web site on behalf of and with support of the customer. Automated financial transactions include direct deposits, automatic withdrawals, and online payment of bills. The second provider may use the data to at least partially recreate the automated financial transactions for the customer in an account with the second provider.

21 Claims, 16 Drawing Sheets

SYSTEM AND METHOD FOR AUTOMATED ELECTRONIC SWITCHING OF CUSTOMER SELECTED FINANCIAL TRANSACTIONS FOR A CUSTOMER BANKING ACCOUNT

CROSS-REFERENCE TO RELATED APPLICATIONS

This application is related in subject matter to, and incorporates herein by reference in its entirety, each of the following: U.S. patent application Ser. No. 11/782,347, entitled "System And Method For Automated Electronic Switching Of Customer Selected Financial Transactions For A Customer Banking Account," filed on Jul. 24, 2007; and U.S. patent application Ser. No. 11/782,362, entitled "System And Method For Automated Electronic Switching Of Customer Selected Financial Transactions For A Customer Banking Account," also filed on Jul. 24, 2007.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field of the Invention

The disclosure relates to a method and system for providing financial products to a customer and, more specifically, to providing automated electronic switching of customer selected financial transactions for a customer banking account from a first provider to a second provider with minimal customer input.

2. Description of Related Art

Customers are typically reluctant to switch service providers because of the inconvenience and effort to transfer data without particularly large incentives, such as significant savings. Bank and other financial institutions may offer quality services at competitive rates, but often find that customers are still reluctant to switch to a new service provider. When moving a banking relationship, the customer generally is especially concerned about moving automated financial transactions. These automated financial transactions generally fall into three categories: direct deposits, automatic withdrawals, and electronic payment of bills. Often, the electronic bill payments are conducted through online Web sites, tone activated systems such as through a telephone, or other electronic based payment system, broadly referenced herein as "Web bill pay." For online payments, the customer may have two categories, namely, those that are pre-assigned to be paid a specific amount on a specific day, and those to which the payee information is already entered and the customer need simply enter the particular amount and instruct payment, where the remaining process is automated. If the customer is financially motivated to switch accounts to another financial provider, the effort involved in switching some or all of the above information to the new provider may be daunting. In at least some cases, a customer is simply resigned to maintaining the existing banking relationship even though financially it may be to the customer's benefit to move the account.

In the past, the best switching tools in the industry appear to have been a system for generation of online forms for customers to print, sign, and mail in order to switch direct deposits, automatic withdrawals, and even close accounts. No solution for switching online bill payment services was found to exist in practice. Some providers provided online switch kits that pre-filled some customer information or provided drop-down menus that failed to switch over the customer data.

Thus there remains a need for an easier and more fully utilized switching system and method for automated electronic transactions of the customer to another financial service provider.

SUMMARY

The present disclosure provides a relatively automated system and method for a customer to change to a new service provider of a financial product, such as banking services. In general, the customer may provide initial data to a new second provider that the second provider may use to automatically and electronically access data about the customer from a prior first provider information source, such as an electronic database of the first provider. The customer data may include a customer credential provided to the second provider to retrieve automated financial data from the first provider's Web site on behalf of and with support of the customer. Automated financial data include direct deposits, automatic withdrawals, and online payment of bills. The second provider may use the data to at least partially recreate the automated financial data for the customer in an account with the second provider.

The disclosure provides a system for transferring financial data of a customer from a first provider to a second provider, comprising: at least one subsystem configured to locate a first provider having customer data for electronic bill payment services, direct deposits, automatic withdrawals, or a combination thereof for the customer; at least one subsystem configured to access the customer data using a customer supplied credential; at least one subsystem configured to electronically obtain the customer data on behalf of the customer using the customer supplied credential; and at least one subsystem configured to automatically transfer at least some of the customer data from the first provider to the second provider to allow the second provider to provide the electronic bill payment services, direct deposits, automatic withdrawals, or the combination thereof for the customer.

The disclosure also provides a method of transferring financial data of a customer from a first provider to a second provider, comprising: locating a first provider having customer data for electronic bill payment services, direct deposits, automatic withdrawals, or a combination thereof for the customer; accessing the customer data using a customer supplied credential; electronically obtaining the customer data on behalf of the customer using the customer supplied credential; and automatically transferring at least some of the customer data from the first provider to the second provider to allow the second provider to provide the electronic bill payment services, direct deposits, automatic withdrawals, or the combination thereof for the customer.

The disclosure further provides a computer-readable medium comprising computer-readable instructions for transferring financial data of a customer from a first provider to a second provider, said computer-readable instructions comprising instructions that: locate a first provider having customer data for electronic bill payment services, direct deposits, automatic withdrawals, or a combination thereof for the customer; access the customer data using a customer supplied credential; electronically obtain the customer data on behalf of the customer using the customer supplied credential; and automatically transfer at least some of the customer data from the first provider to the second provider to allow the second provider to provide the electronic bill payment services, direct deposits, automatic withdrawals, or the combination thereof for the customer.

The disclosure provides a system for transferring financial data of a customer to a financial provider, comprising: at least one subsystem configured to locate an electronic source of financial data of a customer for electronic bill payment services, direct deposits, automatic withdrawals, or a combination thereof; at least one subsystem configured to electronically obtain the customer data on behalf of the customer; and at least one subsystem configured to automatically transfer at least some of the customer data from the electronic source of financial data to an account with the financial provider on behalf of the customer to allow the financial provider to provide the electronic bill payment services, direct deposits, automatic withdrawals, or a combination thereof.

The disclosure also provides a method of transferring financial data of a customer to a financial provider, comprising: locating an electronic source of financial data of a customer for electronic bill payment services, direct deposits, automatic withdrawals, or a combination thereof; electronically obtaining the customer data on behalf of the customer; and automatically transferring at least some of the customer data from the electronic source of financial data to an account with the financial provider on behalf of the customer to allow the financial provider to provide the electronic bill payment services, direct deposits, automatic withdrawals, or a combination thereof.

The disclosure further provides a computer-readable medium comprising computer-readable instructions for transferring financial data of a customer to a financial provider, said computer-readable instructions comprising instructions that: locate an electronic source of financial data of a customer for electronic bill payment services, direct deposits, automatic withdrawals, or a combination thereof; electronically obtain the customer data on behalf of the customer; and automatically transfer at least some of the customer data from the electronic source of financial data to an account with the financial provider on behalf of the customer to allow the financial provider to provide the electronic bill payment services, direct deposits, automatic withdrawals, or a combination thereof.

The disclosure provides a system for transferring financial data of a customer from a first provider to a second provider, comprising: at least one subsystem configured to electronically access a second provider interface; at least one subsystem configured to select a first provider from the second provider interface; at least one subsystem configured to provide a customer credential to the second provider; at least one subsystem configured to allow the second provider to access financial data of the customer available from the first provider regarding electronic bill payment services, direct deposits, automatic withdrawals, or a combination thereof; and at least one subsystem configured to allow the second provider to automatically transfer at least some of the customer data from the first provider to the second provider to allow the second provider to provide electronic bill payment services, direct deposits, automatic withdrawals, or a combination thereof.

The disclosure also provides a method of transferring financial data of a customer from a first provider to a second provider, comprising: electronically accessing a second provider interface; selecting a first provider from the second provider interface; providing a customer credential to the second provider; allowing the second provider to access financial data of the customer available from the first provider regarding electronic bill payment services, direct deposits, automatic withdrawals, or a combination thereof; and allowing the second provider to automatically transfer at least some of the customer data from the first provider to the second provider to allow the second provider to provide electronic bill payment services, direct deposits, automatic withdrawals, or a combination thereof.

The disclosure further provides a computer-readable medium comprising computer-readable instructions for transferring financial data of a customer from a first provider to a second provider, said computer-readable instructions comprising instructions that: electronically access a second provider interface; select a first provider from the second provider interface; provide a customer credential to the second provider; allow the second provider to access financial data of the customer available from the first provider regarding electronic bill payment services, direct deposits, automatic withdrawals, or a combination thereof; and allow the second provider to automatically transfer at least some of the customer data from the first provider to the second provider to allow the second provider to provide electronic bill payment services, direct deposits, automatic withdrawals, or a combination thereof.

BRIEF DESCRIPTION OF THE DRAWINGS

While the concepts provided herein are susceptible to various modifications and alternative forms, only a few specific embodiments have been shown by way of example in the drawings and are described in detail below. The figures and detailed descriptions of these specific embodiments are not intended to limit the breadth or scope of the concepts or the appended claims in any manner. Rather, the figures and detailed written descriptions are provided to illustrate the concepts to a person of ordinary skill in the art as required by 35 U.S.C. §112.

DETAILED DESCRIPTION

Figure 1:
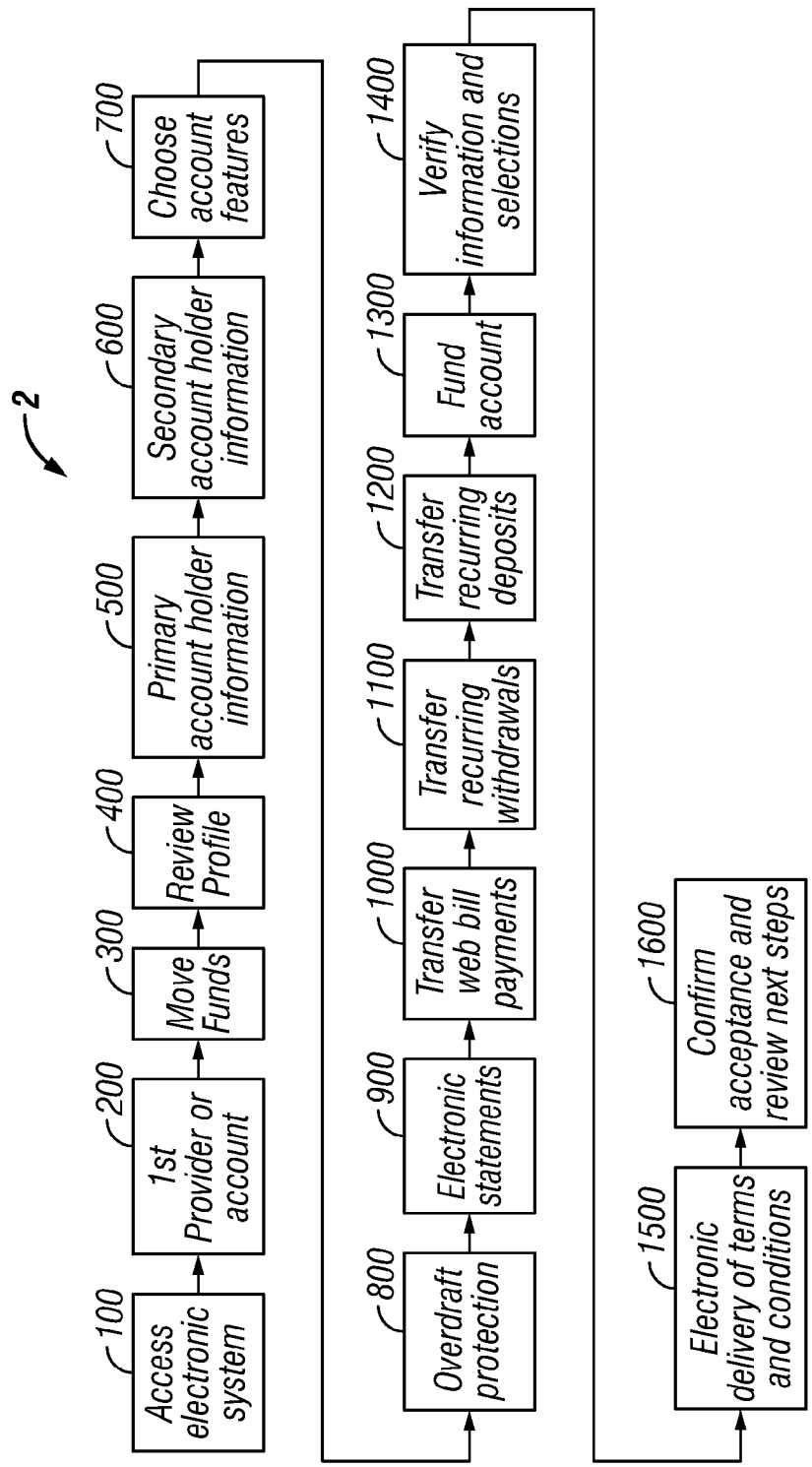
FIG. 1 is a schematic flowchart of an embodiment of a system and method for moving financial information of a customer from a first provider to a second provider.
Figure 2A:
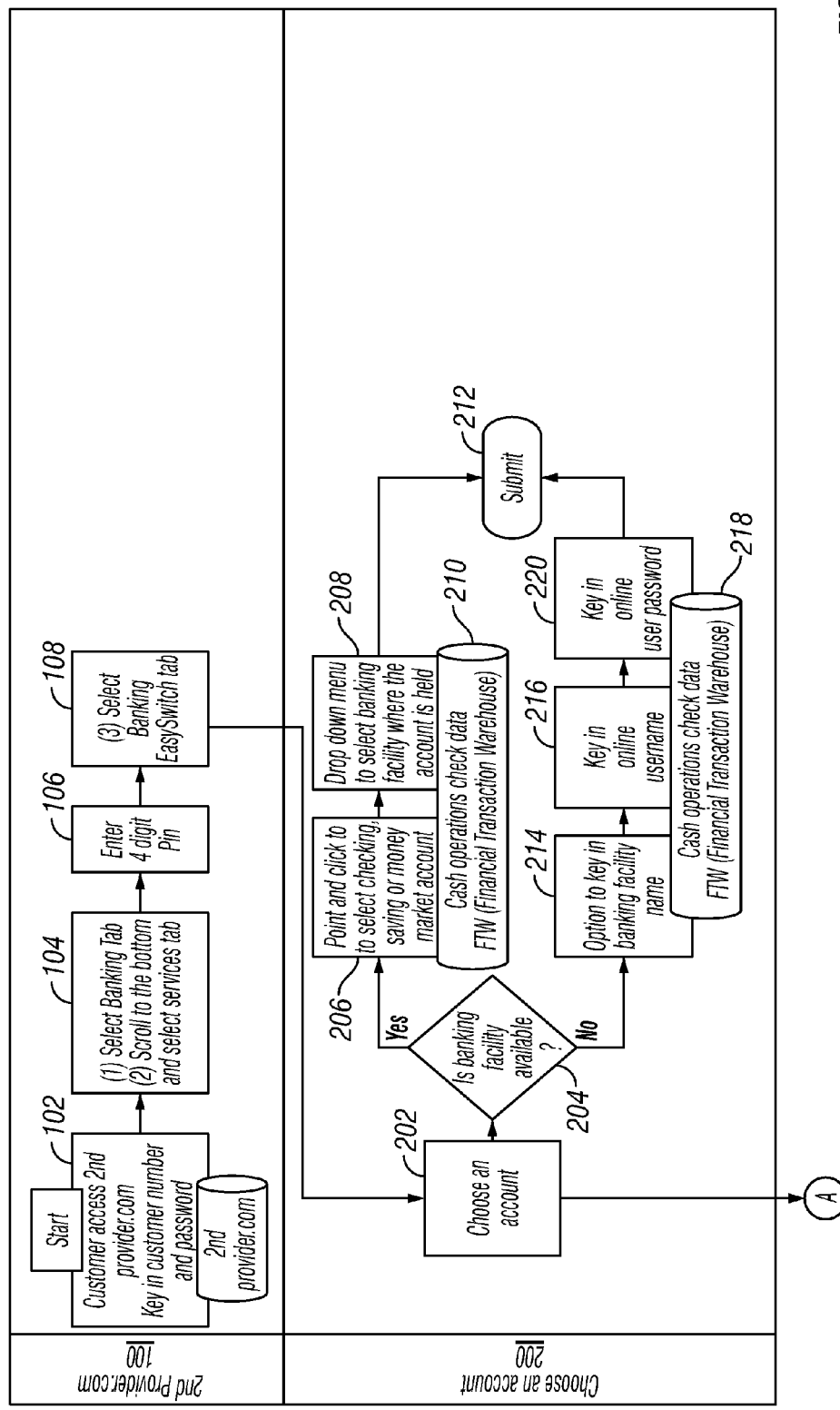
FIG. 2 collectively represented by FIGS. 2A-2H is an exemplary expanded schematic flowchart of the flowchart in FIG. 1.
Figure 2B:
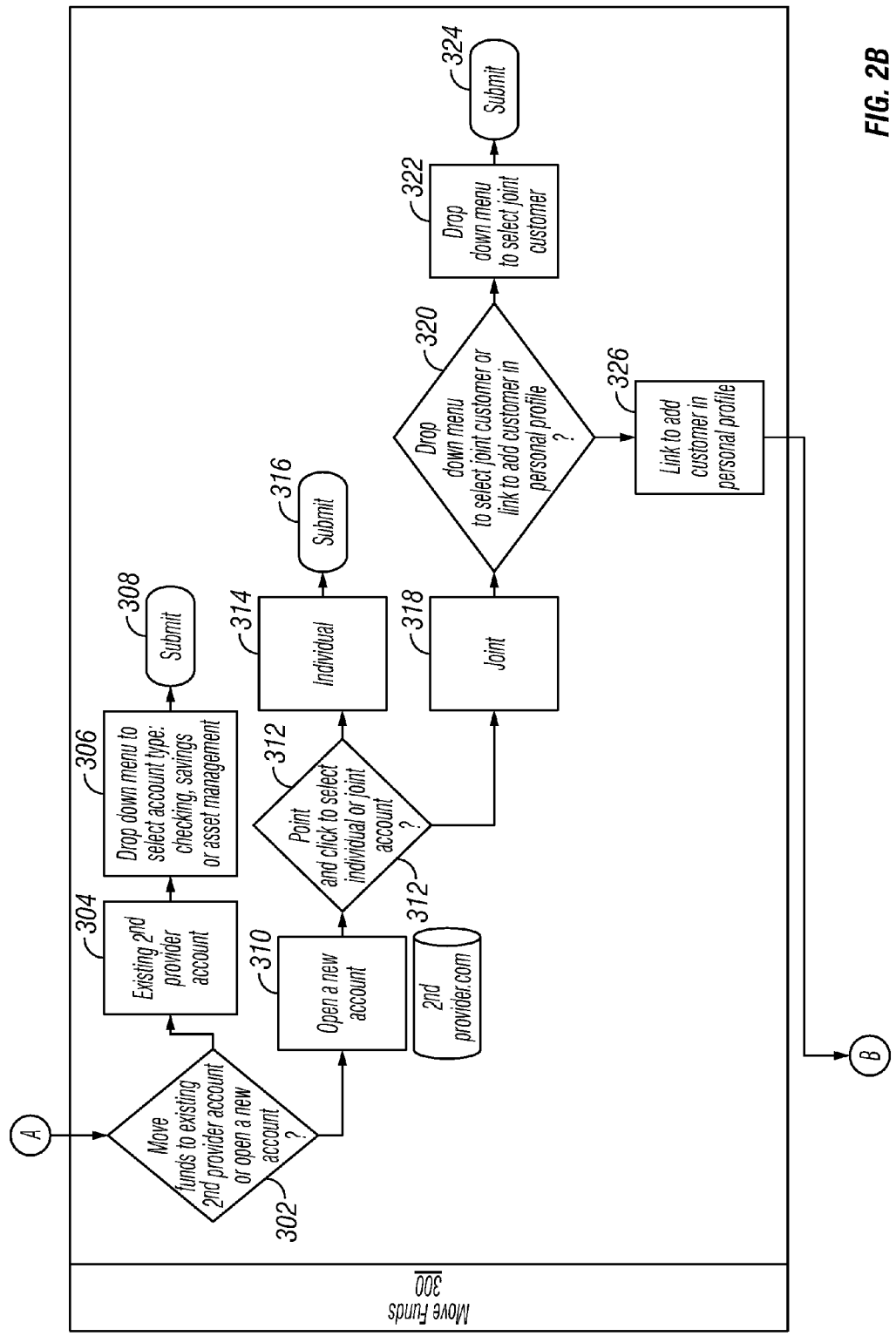
Figure 2C:
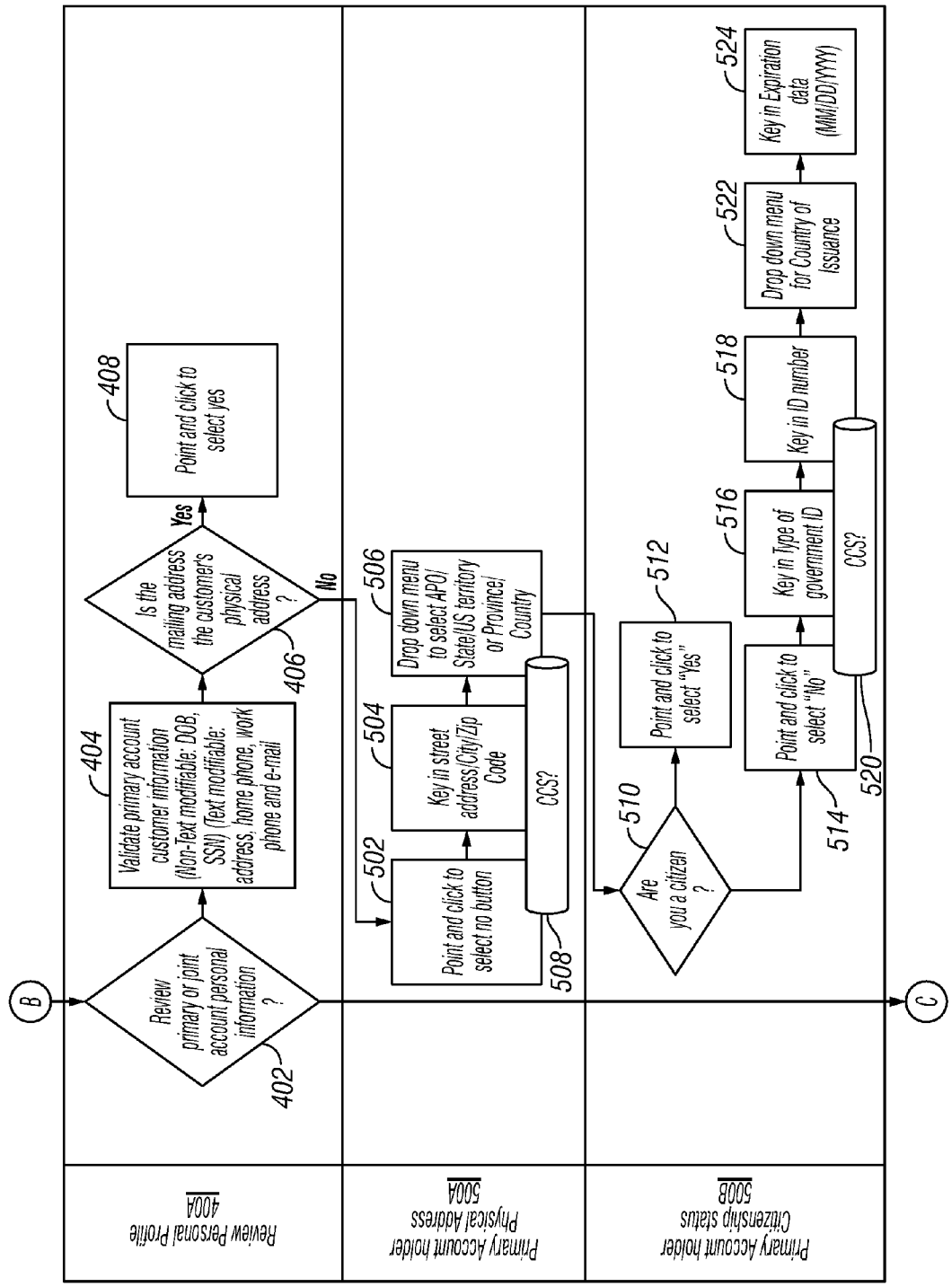
Figure 2D:
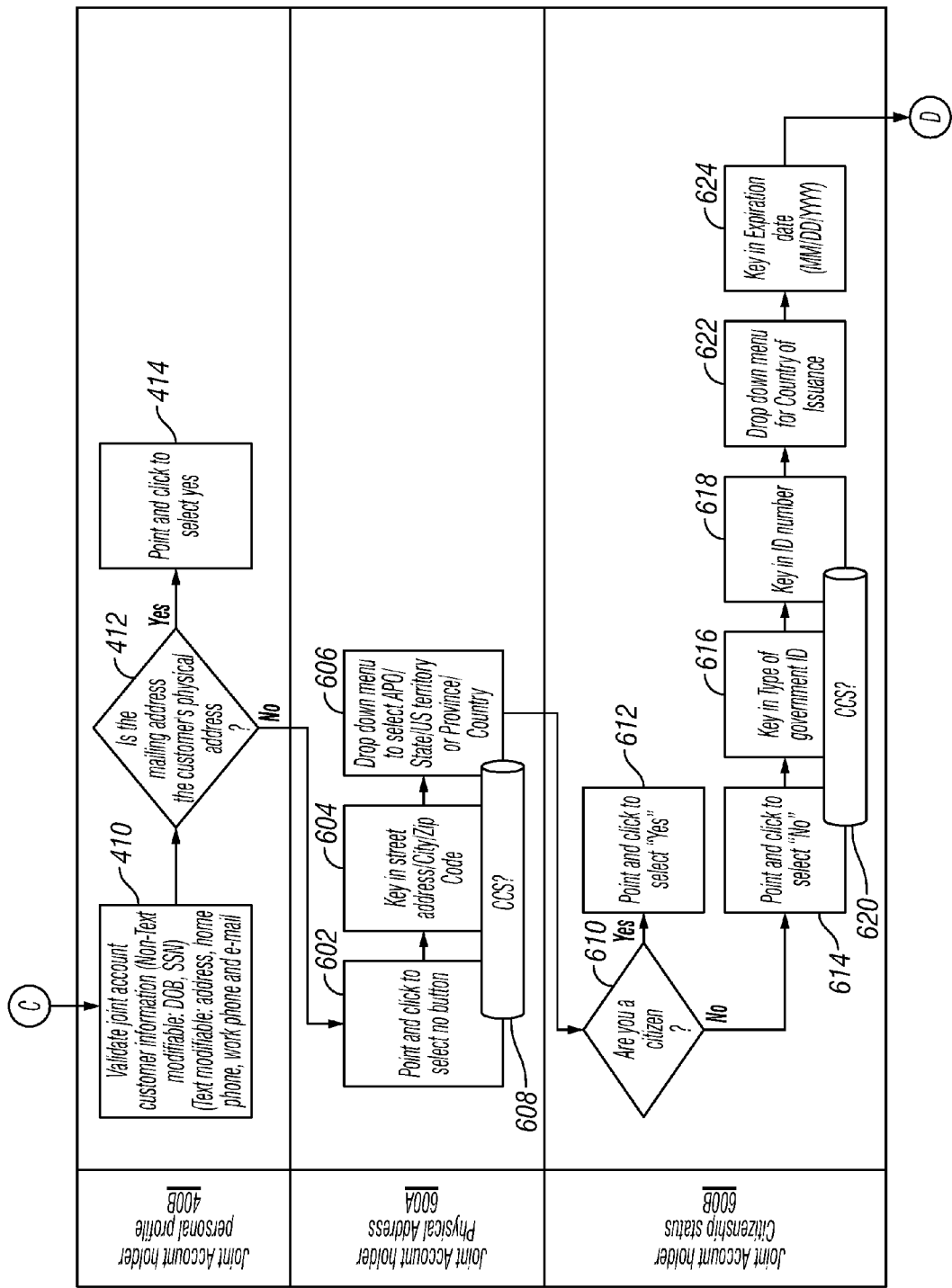
Figure 2E:
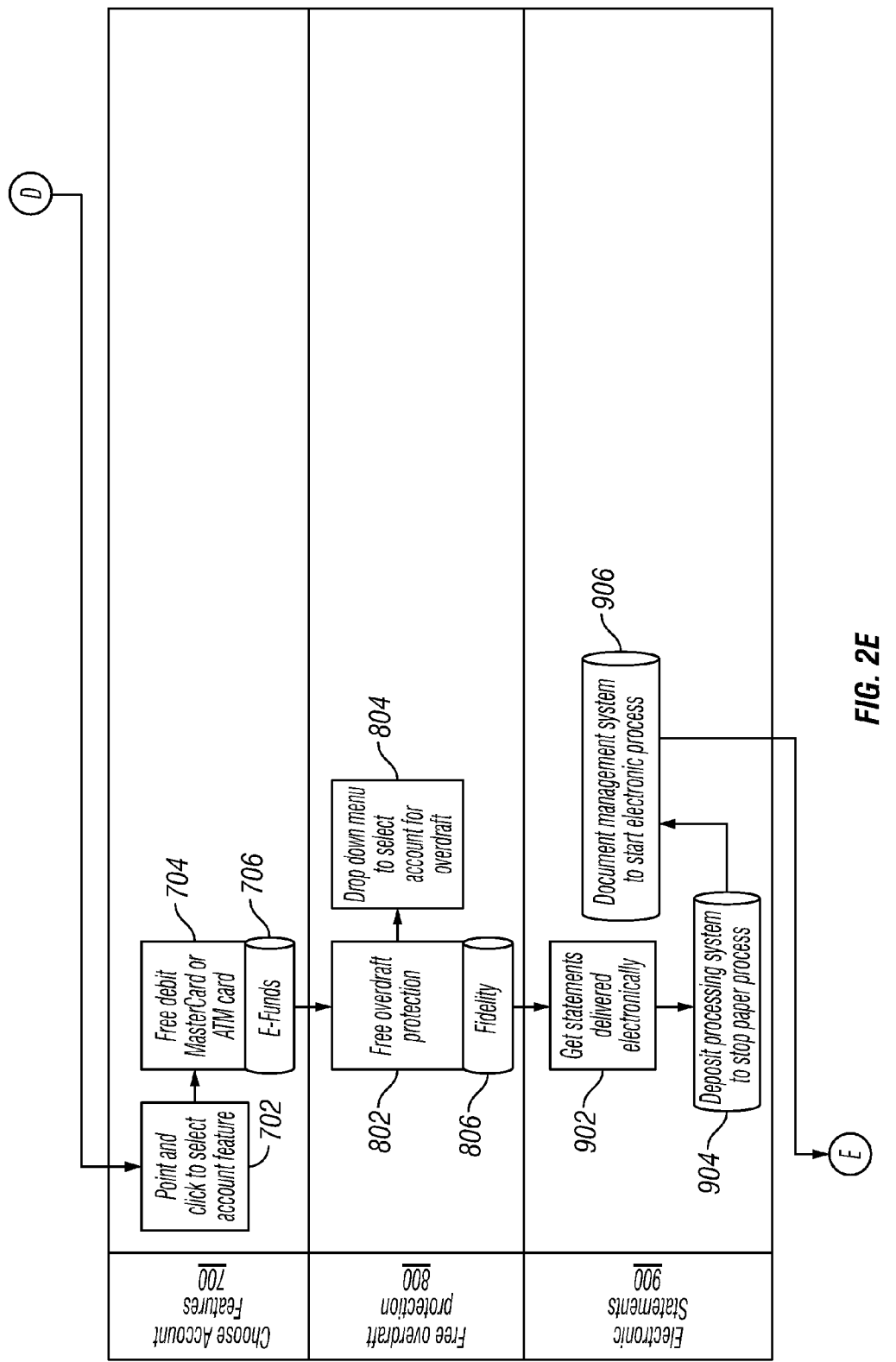
Figure 2F:
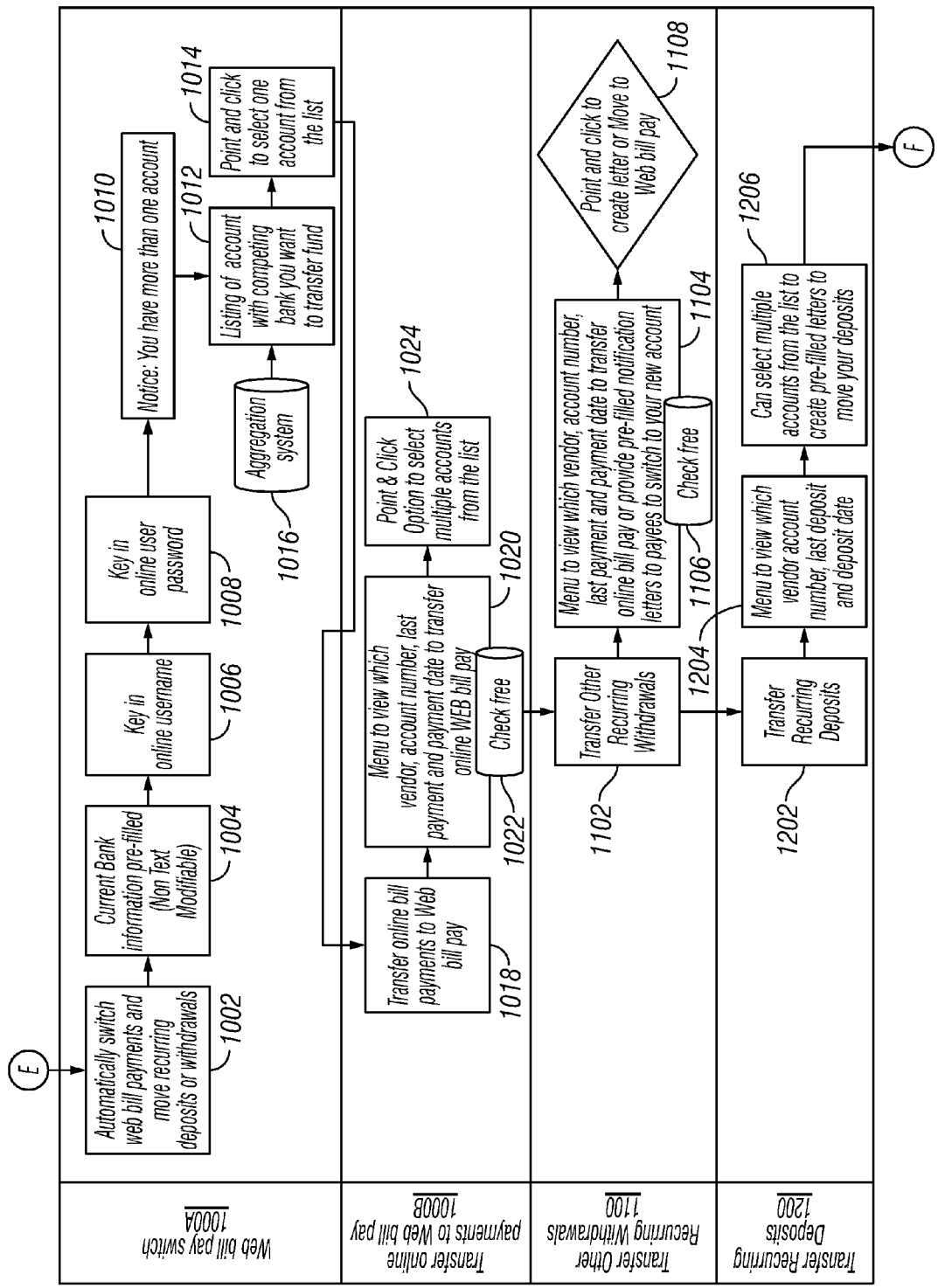
Figure 2G:
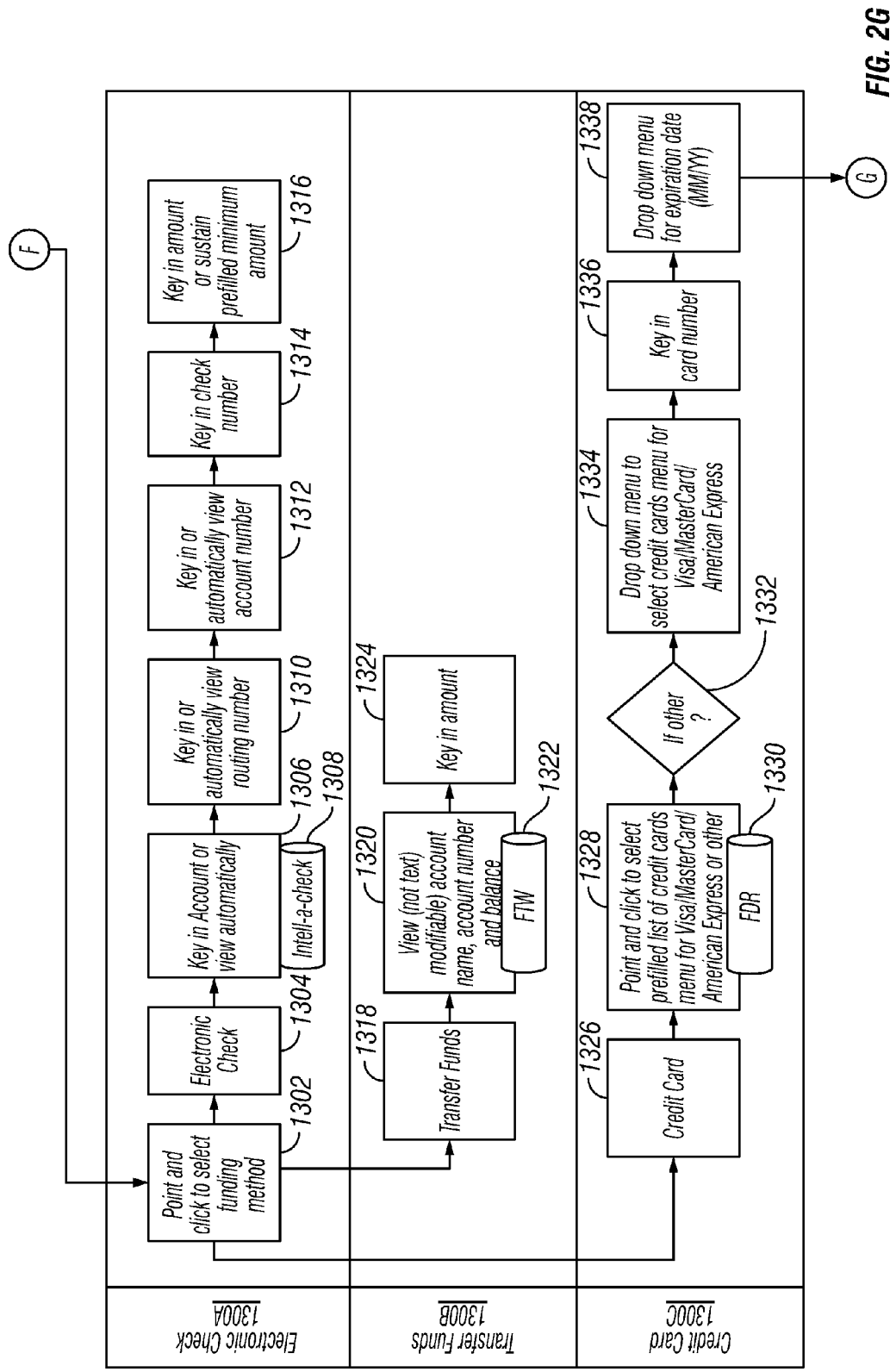
Figure 2H:
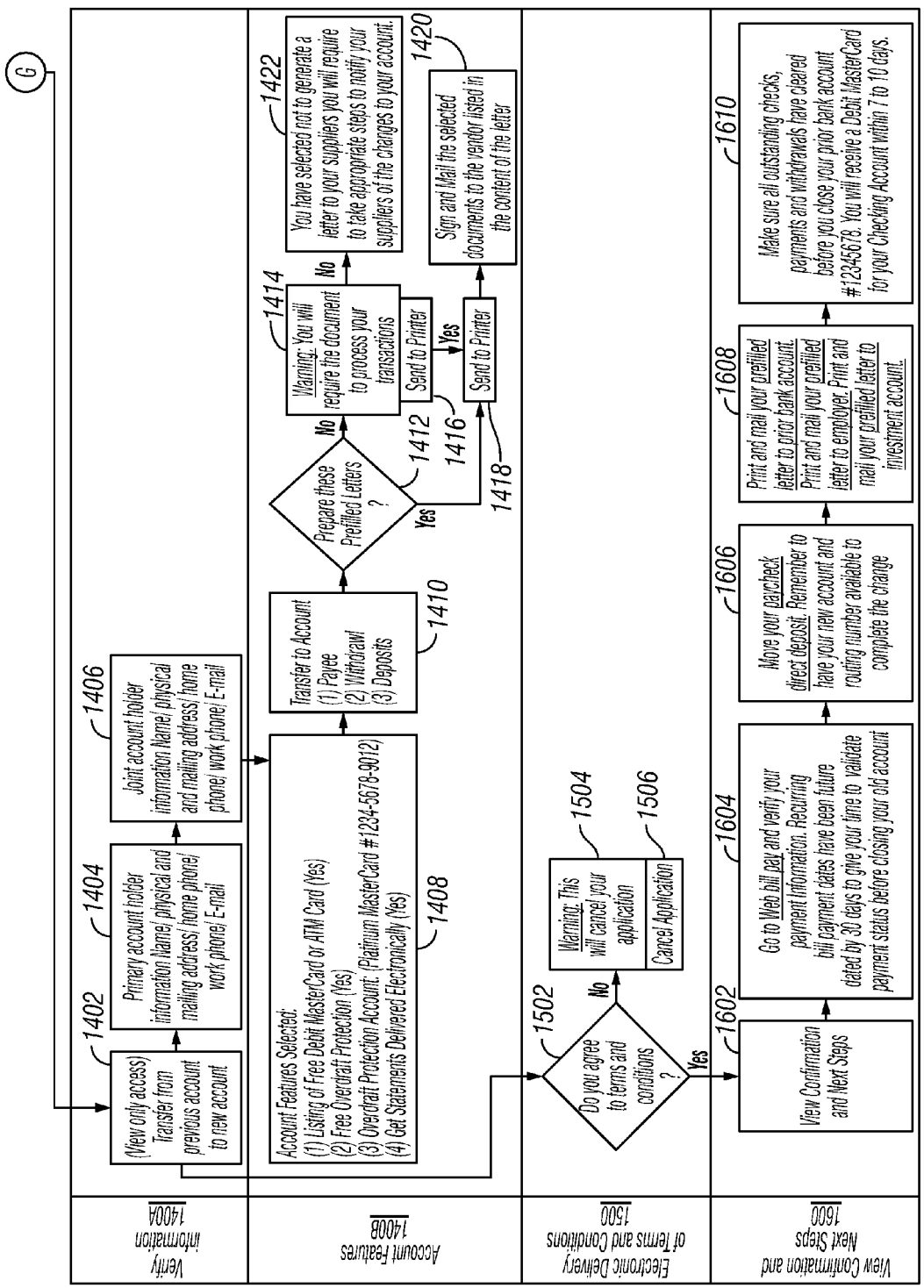

One or more illustrative embodiments of the concepts disclosed herein are presented below. Not all features of an actual implementation are described or shown in this application for the sake of clarity. It is understood that the development of an actual embodiment, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Generally, at least one embodiment of the present disclosure provides for identifying an external account of a first provider of financial products used by the customer, automatically setting up bill payment transactions and other financial information previously used by the customer from the first provider account to the second financial provider to which the customer wishes to transfer the information, setting up automatic deposits, setting up automatic withdrawals, and transferring funds to the account of the second provider. The term "first provider" in the present disclosure is used to indicate an earlier provider of a financial product, such as a bank account, from which the customer seeks to transfer customer information, and the term "second provider" is used to indicate the provider of a financial product to which the customer wishes to transfer the customer information. The disclosure further provides for assistance in closing the external account of the first provider if the customer so chooses. In at least one embodiment, the disclosure teaches acquiring banking institutions, account information and the like of various financial providers, presenting a short list of possible accounts or account numbers from which the customer may select, obtaining the customer's name and password for the particular first provider and/or account, acquiring the external account balance and automated financial transactions information on behalf of the customer, and automatically transferring the customer data to an account of the customer with a second provider. Such data may be acquired through using modified aggregator services of commercial providers. Further, in automatically setting up the automated financial transactions, the disclosure provides for identifying the current bill payment schedule, retrieving bank transaction data using the aggregated service with any known customer data already known to the second provider, retrieving billers' addresses from aggregator service databases, second provider database, or other databases as may be publicly available, presenting a short list of possible payees, addresses, and payment dates for the customer's selection and/or adjustment, and automatically populating the bill payment schedule on the second provider account for the customer based upon the customer's selection. In setting up automatic deposits, the disclosure may provide for acquiring current employer information from a credit bureau or other source, allowing the customer to verify the current deposit information and/or set up new deposits as desired, and offer to mail a change authorization with electronic signature or e-mail a form, such as in an Adobe PDF format, for the customer to sign and mail to the party from whom the deposit is obtained. For setting up automatic withdrawals, the disclosure may provide for sending notice to designated parties for automatic withdrawals to be directed to the account of the second provider. The procedure is similar to the procedure described above for automatically setting up the bill payment by retrieving the information, presenting a list of payees and relevant information, and automatically populating the database of the second provider account with the information as may be adjusted by the customer. Further, the system may provide to offer to mail a change authorization with an electronic signature of the customer, or e-mail a form for the customer to sign and mail. For transferring funds and possible closing of the first provider account, the disclosure provides for allowing the customer to electronically authorize a funds transfer from the first provider account, and offering to mail a change authorization with an electronic signature of the customer or e-mail a form to the customer to sign and mail themselves.

The first provider account(s) of the customer may be located by a number of search criteria, including the name or address of the customer, any routing number used by the customer to which the second provider may have knowledge, a generalized list of first providers that are frequently used or in which potential customer data may be found, and other parameters. Further, the customer may manually enter the first provider and account information for the second provider to automatically transfer the data therein. If the customer is an existing customer of the second provider, the second provider may have additional information regarding prior electronic funds transfer from a given account that may be suggested to the customer and offered as a selection. Once the account or accounts are selected by the customer to transfer information from, the customer may provide log-in credential(s) of the account or accounts to the second provider, which the second provider may use to automatically access and retrieve information from the first provider account or accounts on behalf of the customer. Typically, a transaction history is available with the first provider account, such as a ninety (90) day period, from which automatic withdrawals, deposits, and bill payment information may be gathered.

In more detail, the customer will choose a first provider and/or an account of a first provider (which may be one or more providers). In this block, the customer chooses which account the customer wishes to transfer the customer data from and possibly close out. The customer may be provided a list of accounts that have been previously used to do business with the second provider in the past, if applicable. If the desired account is not present in the list, the customer may select a bank from a provided list. If the account is not available to the user, the user may do a keyword search to locate the account of the first provider. Using search functions or selecting a bank from a list may result in a need to select a specific account number. After providing details about the external account of the first provider, the customer may select a corresponding account of the second provider or choose to open a new account of the second provider to transfer the customer data.

The customer may review personal data that the second provider may have on file if the customer is a present customer of the second provider. Alternatively, the customer may provide personal data, such as contact information, tax information including social security number, and other information as may be appropriate for the particular financial product to be provided by the second provider.

The customer may choose account features for the particular account of the second provider to which the customer is transferring the data. Such features may vary depending on the particular account, and would generally include the option to select overdraft protection, the offer of a debit card or ATM card, and other features as may be desired or offered. The customer may also be requested to provide at least one customer credential, such as a customer user name and password or other log-in credentials, for the account of the first provider if the customer wishes to automatically switch the big bill payments and move recurring deposits and withdrawals into the account of the customer with the second provider. After entering a customer credential, the system and method may access the first provider to determine the customer's list of accounts and verify that these accounts still exist. If the customer selected only a first provider in an earlier block, the system and method may continue automatically if only one account is found. If the system finds multiple accounts of the customer at the first provider, then the customer may be directed to identify which accounts are to be accessed. Once the accounts are identified, the system and method accesses the account or accounts of the customer with the first provider to retrieve data on bill payment, automatic deposit, and/or automatic withdrawal details from the account of the first provider. This data is presented to the customer who selects which bill payees the customer wishes to set up at the second provider, which automatic withdrawals to transfer to the account of the second provider, or convert to bill payees, and/or which direct deposits the customer wishes to transfer to the second provider account.

Further, the disclosure provides that the customer will be presented with one or more ways to fund the account, such as with a minimum balance. Such ways include transferring a balance from the account of the first provider. Use of an aggregation service allows the second provider to pre-fill one or more fields when transferring funds and display the account balance of the first provider.

The process may include requesting the customer to verify data provided, including personal information and choices for the account, and choices for the transfer of the data. The verification may include a confirmation process that confirms the choices made by the customer and provides a list of next blocks, including the generation of letters for those portions of the transfer that cannot be fully automated. The letters may be generated electronically and provided to the customer to be printed out at the customer's printer and mailed, or the letters may be sent electronically by the customer if appropriate.

The following figures illustrate various embodiments of the system in more detail. It includes specific exemplary blocks by which the various transfer of data may be made. However, it is to be understood that various other embodiments may, and are contemplated that generally would encompass the automatic transfer of at least a portion of customer data from a first provider to a second provider of automatic withdrawals, automatic deposits, bill payment information, or a combination thereof with minimum customer input.

FIG. 1 is a schematic flowchart of an embodiment of a system and method for moving financial information of a customer from a first provider to a second provider. In general, the system and method involves entering the customer information (herein "data"), such as automatic withdrawals, automatic deposits, bill payment data, and related customer identification information over Web access and other online systems from a first provider of a financial product such as a bank account to a second provider. The system and method automates at least in part the transfer of such data to lessen the amount of input required by the customer and facilitate the transfer for the convenience of the customer. The system 2, represented by the flowchart elements, may include in general, the customer conducting financial transactions through online or other remote services from the first provider to a second provider, and the second provider providing the system, processor instructions, and appropriate architectures to facilitate such transactions. In Block 100, the customer accesses an electronic system, such as an online Web site of the second provider. In Block 200, the customer chooses one or more first providers and/or accounts of the first providers from which the customer data will be transferred to an account with the second provider. In Block 300, the customer chooses an account with the second provider into which the financial data and/or funds from the first provider will be moved. If the customer does not have such an account, the customer may choose what type of account to set up, including savings account, checking account, money market account, and other accounts as may be provided by the second provider. If the customer simply wishes to move funds from the first provider to the second provider, the customer may make such an election. The appropriate instructions, amounts, dates, and so forth may be provided to the system. If the customer prefers to open a new account with the second provider, then generally the customer will need to provide data relative to the customer, any joint holders, account features, and so forth to enable the transfer into the new account. In Block 400, the customer may review the customer's profile to ensure correct primary or joint account personal data. In Block 500, the primary account customer data may be verified or supplemented. In Block 600, the primary account customer may review any secondary account customer profile data, if applicable, such as a joint account holder on behalf of the secondary account customer. Alternatively, a secondary account customer may review the secondary account customer profile data. In setting up the new account, the customer may choose various account features in Block 700. Such features may include overdraft protection in Block 800, electronic statements in Block 900, and other features. Further, the customer may decide to transfer bill payments in Block 1000 that would, for example, be set up already with the first provider. Such bill payments may include preauthorized payments at certain dates and certain amounts, pre-entered data whereupon the customer selects the amount and date and thereafter is automated, or a variation thereof. Further, the customer may elect to transfer recurring withdrawals in Block 1100 and/or recurring deposits in Block 1200.

At some time, the customer may fund the account in Block 1300. The funding may occur from electronic transfer of funds, for example, from the account of the first provider, through credit card, or through other electronic media. In other cases, the customer may prefer to fund the account through in-person deposits, via mail, money orders, cashier's checks, or personal or business checks. Further, the customer may already have funding in the account if the customer has an existing account with the second provider. In Block 1400, the customer may verify the data and the selections made. In Block 1500, the customer may be provided electronic delivery on terms and conditions, and other data of which the second provider may be required to, or wish to deliver to, the customer. In Block 1600, the customer may confirm acceptance of the terms and conditions. Further, the customer may review any further blocks as may be appropriate for the particular transaction. Such further blocks may include authorizing e-mail letters or notices to employers and others from whom money is deposited into the customer's account, notifying other entities of the redirection of automatic withdrawals, closing the account of the first provider, or other options as may be appropriate.

FIG. 2 collectively represented by FIGS. 2A-2H and generally referenced herein as FIG. 2 is an exemplary expanded schematic flowchart of the flowchart in FIG. 1. The figures illustrate a more detailed flowchart with a continuation from one page of the flowchart to the next as shown by the continuation symbols therein. For simplicity, each section of the detailed flowchart exemplified by the horizontal segmented portions illustrates details of the blocks designated in FIG. 1. For example, exemplary details of Block 100 of FIG. 1 are shown in the segmented portion 100 of FIG. 2, sheet 2A.

In accessing an electronic database in Block 100, shown in FIG. 1 and further illustrated in FIG. 2, the customer may access a Web site from which the second provider may offer financial products in Block 102. The customer may register, or if already registered, enter the Web site using a customer credential, such as a customer identifier and/or password. In Block 104, the customer may select a banking tab that may include other tabs, such as customer services and the like. In Block 106, the customer may be further required to enter additional security identifiers, such as four digit personal identification number ("PIN"), social security number, and so forth. In Block 108, the customer may select an option that initializes the transfer of the financial data and other customer data according to the disclosure herein.

In Block 200, as shown in FIG. 1 with further illustrated in FIG. 2, the customer may choose an account from a first provider in Block 202. In Block 204, the system may query whether the chosen first provider, such as a banking facility, is available and accessible electronically, such as through a Web interface. If the facility is shown and available for selection, then in Block 206, the customer may point and select the type of account of the first provider account, such as a checking, savings, or money market account. In Block 208, the customer may also be offered a list of one or more first providers from which the customer account may be held. For example, in Block 210, such data may be obtained from a cash operations check data using financial transaction warehouse (FTW) data. Based upon such selections, the customer may submit the data in Block 212 to the second provider.

On the other hand, if the banking facility is not readily available to the customer from the Web site of the second provider, the customer may enter in the name of the first provider in Block 214. Further, a customer credential, such as an online user name in Block 216, and password in Block 220, may be manually keyed in or otherwise provided to the second provider. The data may be checked by the cash operations check data using FTW in Block 218. Once the data is provided, the customer may select to submit this data to the second provider in Block 212.

In Block 300, shown in FIG. 1 and further illustrated in FIG. 2, the customer may elect to move funds to the existing second provider account or open a new account in Block 302. If the customer wishes to use an existing account in Block 304, then the customer may access menus and other selection options to select the account type such as checking, savings, or money market in Block 306 and submit the instructions to transfer funds in Block 308. If the customer wishes to use a new account in Block 310, the customer may set up a new account. For example, the customer may point and click to select an individual or joint account in Block 312. If the individual wishes to set up an individual account in Block 312, the customer may make such selection and submit such choice in Blocks 314 and 316. If a joint account is desired in Block 318, the customer may also use, for example, a drop down menu to select a joint customer or link to add a customer to the personal profile in Block 320. If the customer is already an existing customer, the customer may be provided a drop down menu in Block 322 to select a particular joint customer and submit selection in Block 324. If the joint customer is not already a customer of the second provider, then the first customer may link to add the joint customer in the personal profile of Block 326.

In Block 400, shown in FIGS. 1 and 2, the flowchart is subdivided into Block 400A for primary account customer data and Block 400B for joint account customer data, if applicable. Each section will be described herein. The customer may review the primary or joint account personal data in Block 402. A customer may validate customer data, such as a primary account holder's data. The data may include date of birth, social security number, and contact information in Block 404. The system may request the customer to identify which mailing address is the physical address in Block 406 with an affirmative answer provided in Block 408. If the account is a joint account, then the customer may validate the joint account customer data in Block 410 in a similar manner. The system may query whether the mailing address of the joint account customer data is the physical address in Block 412. If the answer is yes, the customer may point and click to select affirmative in Block 414.

The primary account customer may provide customer data as may be appropriate for the particular financial product to be provided. For illustrative purposes, the Block 500 has been subdivided into Blocks 500A, 500B in FIG. 2. If the mailing address is not the customer's physical address in Block 406, then in Block 502, the customer may be asked to point and select a negative reply button and provide the physical address, such as street address, city, and zip code in Block 504. The customer may further be asked to indicate whether the address is a forwarding address, the state or U.S. territory, province, county, or other geographical details. The data may further be obtained in some instances from an aggregated source accessing certain databases, including financial databases. The customer may further be asked other data that may be pertinent to the particular financial product, including citizenship in Block 510. If the answer is affirmative, the customer may indicate such in Block 512. If the answer is negative, in Block 514, the customer may be requested to enter a type of government identification in Block 516. Such identification may be used for meeting requirements for taxation and so forth for the customer. The particular customer identification number relevant to the type of government identification may be entered in Block 518 with a particular country of issuance in Block 522, and an expiration date in Block 524. Such data may again be confirmed by various public databases or databases for hire in Block 520 to the extent such data is available.

In Block 600, shown in FIG. 1 and further illustrated in FIG. 2, the joint account customer data may be reviewed, entered, or a combination thereof. The Block 600 is subdivided into Block 600A-600B in FIG. 2. As has been described above for the primary account customer in Block 500, a similar technique may be provided in Block 600. For example, the system may query if the mailing address for the member is the joint account customer's physical address in Block 412. If the answer is negative, the customer may be asked to indicate the negative in Block 602 and provide such data in Block 604. Further, the customer may provide the customer's country or state of residence in Block 606. The data may be confirmed in Block 608. Further, the system may query whether the joint account customer is a citizen in Block 610. If the joint account customer is a citizen, a customer may indicate such in Block 612. If the customer is not a citizen, the customer may indicate such in Block 614 and provide identification data in Blocks 616, 618, 622, and 624. The data may be confirmed to the extent available in Block 620 using commercial database data.

In Block 700, shown in FIG. 1 and further illustrated in FIG. 2, the customer may point and select to select various account features offered in Block 702. By way of example, such account features may include a debit card, ATM card, or a combination thereof in Block 704 to which electronic funds may be accessible in 706.

Further, the customer may be offered overdraft protection in Block 800 shown in FIGS. 1 and 2. For example, the customer may be offered free overdraft protection in Block 802. To make such a selection, the customer may choose to select such an account for the overdraft in Block 804. Generally, such overdraft protection is linked commercially with another account from which funds may be available or an arrangement with the service that may automatically provide a loan under certain terms and conditions. Such an account manager may be provided in Block 806.

In Block 900, shown in FIGS. 1 and 2, the customer may elect to have statements delivered electronically in Block 902. Further, the system through a deposit processing system may stop the paper process in Block 904. The system through a document management system may start the electronic process in Block 906.

In Block 1000, shown in FIG. 1 and further illustrated in FIG. 2 as Blocks 1000A, 1000B, the customer may elect to transfer automated bill payments, for example using Web-based online services. For example, the customer may elect to automatically switch financial transactions using Web access to the account with the second provider. Such financial transactions include bill payments, recurring deposits, withdrawals or a combination thereof in Block 1002. In Block 1004, the customer may review the account data with the second provider that has either been set up as a new account, or is a current account with a second provider. Such data may be pre-filled in a data screen to show the customer for review. Optionally, and for security reasons, the second provider may request the customer to enter a customer credential, such as an online user name in Block 1006, and if applicable, a customer password in Block 1008. If the customer has more than one account with the second provider, a notice may be given to the customer in Block 1010 to alert the customer of the existence of multiple accounts. Such block may invite the customer to ensure that the customer is directing the activity from and to the proper account. Further, the customer may be given a listing of accounts with the first provider from which customer wishes to transfer the customer data to the second provider in Block 1012. If multiple accounts are available, the customer may select, such as by pointing and clicking, to one or more accounts from a list provided in Block 1014. If the data is sufficiently disbursed or otherwise suitable for aggregation, an optional Block 1016 may be used to provide data to Block 1012 to list the accounts. From the selections in Block 1014, the data may be transferred to the second provider into a bill payment system in Block 1018. If there are multiple bill payees, a menu or other communication may be provided to the customer in Block 1020 to view which vendor payments are to be transferred to the electronic bill payment services with the second provider. Other data may also be provided, such as associated vendor account number, last payment, and payment date. In some embodiments, the automated bill payment provision may be provided at no charge in Block 1022. For multiple accounts, the customer may point and click or otherwise select additional accounts from the list to transfer customer data to the second provider in Block 1024.

In Block 1100, shown in FIG. 1 and further illustrated in FIG. 2, the customer may also transfer recurring withdrawals. For example, the customer may elect to transfer recurring withdrawals in Block 1102 that may lead the customer to a menu or other representation in Block 1104 of the various vendors, account numbers, last payment and payment date, to transfer to the second provider. The transfer may include transferring such data to the electronic bill payment services of the system, or provide pre-filled notification letters to the payees to switch to the account with the second provider. In some embodiments, the service may be offered at no charge in Block 1106. As appropriate, the customer may be provided with automatic letters created from the available data for the customer to send either electronically, to print and send by hardcopy communication to the payee, or move automatically to the bill payment services of the second provider in Block 1108.

In Block 1200, as shown in FIG. 1 and further illustrated in FIG. 2, the customer may also transfer recurring deposits. For example, the customer may elect to transfer recurring deposits in Block 1202 to which the customer may be directed to menu or other communications which may illustrate the vendor, account number, last deposit, and deposit date and/or other data in Block 1204. The customer may select multiple accounts from the list to create pre-filled letters to move the deposits from the first provider to the second provider in Block 1206. In some instances, the menu may provide direct links to the entity depositing the funds, so that the transfer may be done electronically without the necessity of forwarding letters.

In Block 1300, shown in FIG. 1 and further illustrated in FIG. 2 as Blocks 1300A, 1300B and 1300C, the customer may need to fund the account at some point in the process. The funding is particularly relevant if the account is a new account with the second provider rather than an existing account that already has funding. For example, the customer may point and click or otherwise select a funding method in Block 1302. If the funding method is through a check, such as an electronic check as shown in Block 1304, the customer may enter an account or view automatically generated data from another account, such as the first provider account as shown in Block 1306. Confirmation may be gained through third-party software and services, such as Intell-A-Check, Corp. of Belleville, N.J., and other service providers for check confirmation as shown in Block 1308. The customer may be directed to enter or view an automatically generated routing number in Block 1310 based on the available customer data, and to enter or view an automatically generated account number in Block 1312. In some embodiments, the customer may be required to enter a check number in Block 1314. Generally, the customer will be required to enter an amount or sustain a pre-filled minimum amount to fund in Block 1316.

If the funding method includes the transfer of funds, the transfer may occur electronically in Block 1318. The customer may view an account name, account number, and balance as shown in Block 1320. Such data may be obtained or verified through FTW procedures in Block 1322. The customer may be asked to enter a specific amount or to sustain a pre-filled minimum amount or provide a minimum amount in Block 1324.

If the funding method includes a credit card as shown in Block 1326, the customer may be asked to point and click or otherwise select from a list of credit cards for Visa, Mastercard, American Express, Discover, or other credit service agencies. Such list may include a pre-filled list of the customer's identified or otherwise known credit cards and account numbers based on the customer's input data, databases, bill payment, or other data accessible to the second provider. The data may be provided through search engines, and other data as may be available to the second provider in Block 1330. If the particular company desired by the customer is not available in a pre-filled list of Block 1328, the customer may be given an option to select another card in Block 1332. For example, the customer may be provided a drop-down menu to select credit cards of a generic nature in Block 1334 without account specific data. To provide such account specific data to the second provider, the customer may enter a particular card account number in Block 1336 and other data, such as expiration date and security codes in Block 1338.

In Block 1400, as shown in FIG. 1 and further illustrated in FIG. 2, the customer may verify the data and selections. In FIG. 2, the verification is divided into groups 1400A and 1400B. More specifically, the customer may be asked to view the transfer data from the account of the first provider to the account of the second provider in Block 1402. Such transfer data may include verifying account data of the customer, such as the name, physical and mailing address, contact information, and other data as appropriate in Block 1404. If the account included a second account customer, then similar data may be verified in Block 1406. The various account features that have been selected, such as the debit card, overdraft protection, and the overdraft protection account, electronic statements, and the like may be verified in Block 1408. The customer may also verify the transfer of financial data to the customer account of the second provider in Block 1410. Such financial data may include the payee, any withdrawal amounts and dates, automatic deposits, or a combination thereof. In some cases, the payee will require letters. The system may query whether the customer in Block 1412 wishes the system to prepare pre-filled letters to a vendor or other party receiving or providing payments to the account. If the customer answers negatively, a warning may be given in Block 1414 to the customer that the document is needed to process the particular requested transactions and give the customer another opportunity to select affirmatively. If the customer selects affirmative, the system may send the letters to the printer in Block 1416. If the customer still answers negatively, then the customer may be provided a notice that they have not selected the generation of the letter to the appropriate parties and that to complete the appropriate blocks, the customer will need to generate or otherwise notify such parties.

Returning to Block 1412, if the customer indicates affirmatively to prepare pre-filled letters, then the customer's letters are sent to a printer in Block 1418. The customer may print, sign, and mail the selected documents to the particular parties listed in the content of the letter as shown in Block 1420.

In Block 1500, as shown in FIG. 1 and further illustrated in FIG. 2, the system may also provide for the electronic delivery of the terms and conditions online while the customer is viewing the data. For example, the customer may be provided electronically the terms and conditions and queried whether the customer agrees to the terms and conditions in Block 1502. If the customer does not agree with the terms and conditions, the customer may be provided a warning that the negative answer will cancel the customer's application to transfer this customer data and/or set up the new account in Block 1504. If the customer continues with the negative response, the application for the transfer, financial data, and/or new account as appropriate may be cancelled in Block 1506.

In Block 1600, as shown in FIG. 1 and further illustrated in FIG. 2, the customer may confirm acceptance and review the next blocks required to complete the process. More specifically, if the customer agrees to the terms and conditions in Block 1502, the customer may view the confirmation and the next blocks to finish the process in Block 1602. For example, the customer may go to a link and/or account as may be appropriate for the bill payment services with the second provider in Block 1604. The customer may reconfirm that such data is appropriate. In some embodiments, the program may set up the recurring bill payment date to be future dated by thirty days to give the customer time to validate the payment status before closing the old account with the first provider. Further, if direct deposit was selected, the customer may be directed to confirm the direct deposit data with the employer or other source of funds and otherwise take blocks external to the online system described herein to finish the transfer in Block 1606, if appropriate. The customer may need to print and mail the pre-filled letters to the prior first provider, various payees, and other parties as shown in Block 1608. The customer may be reminded in Block 1610 of the need to have all outstanding checks, payments, withdrawals cleared before closing the account with the first provider, if the customer so intends. The customer may be provided further data as to the expected delivery date of any of the features elected in the second provider account, such as a debit card, ATM card, electronic statements, and the like.

Figure 3:
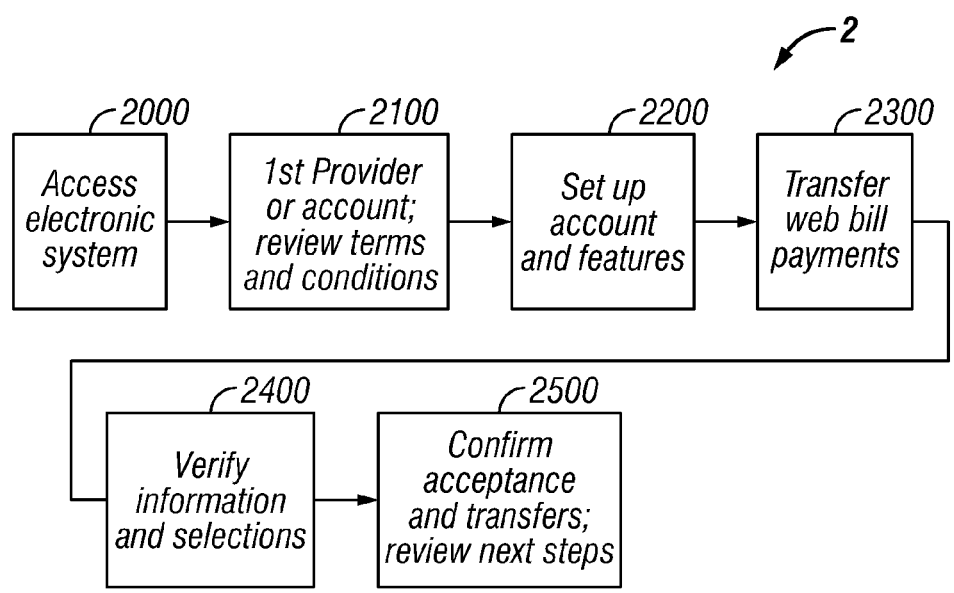
FIG. 3 is another exemplary schematic flowchart of another embodiment of the disclosure provided herein for transferring financial data from a first provider to a second provider.
Figure 4A:
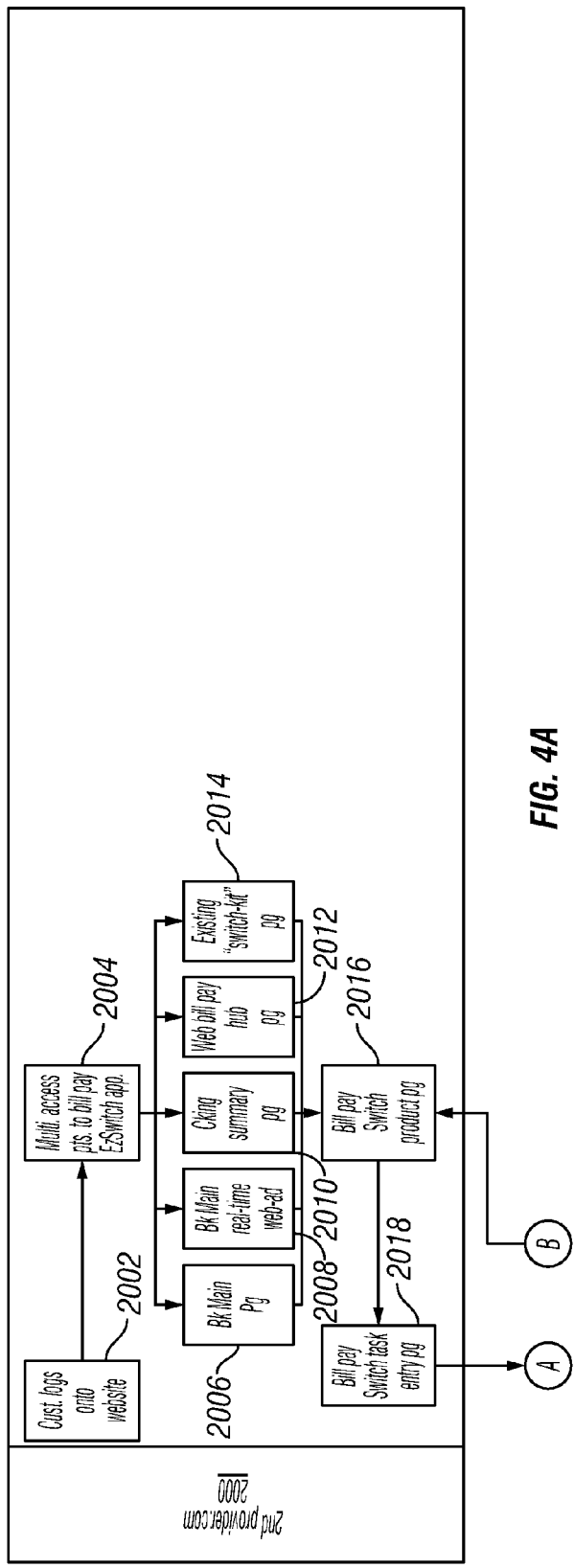
FIG. 4 collectively represented by FIGS. 4A-4D is an exemplary expanded schematic flowchart of the general system and method illustrated in FIG. 3.
Figure 4B:
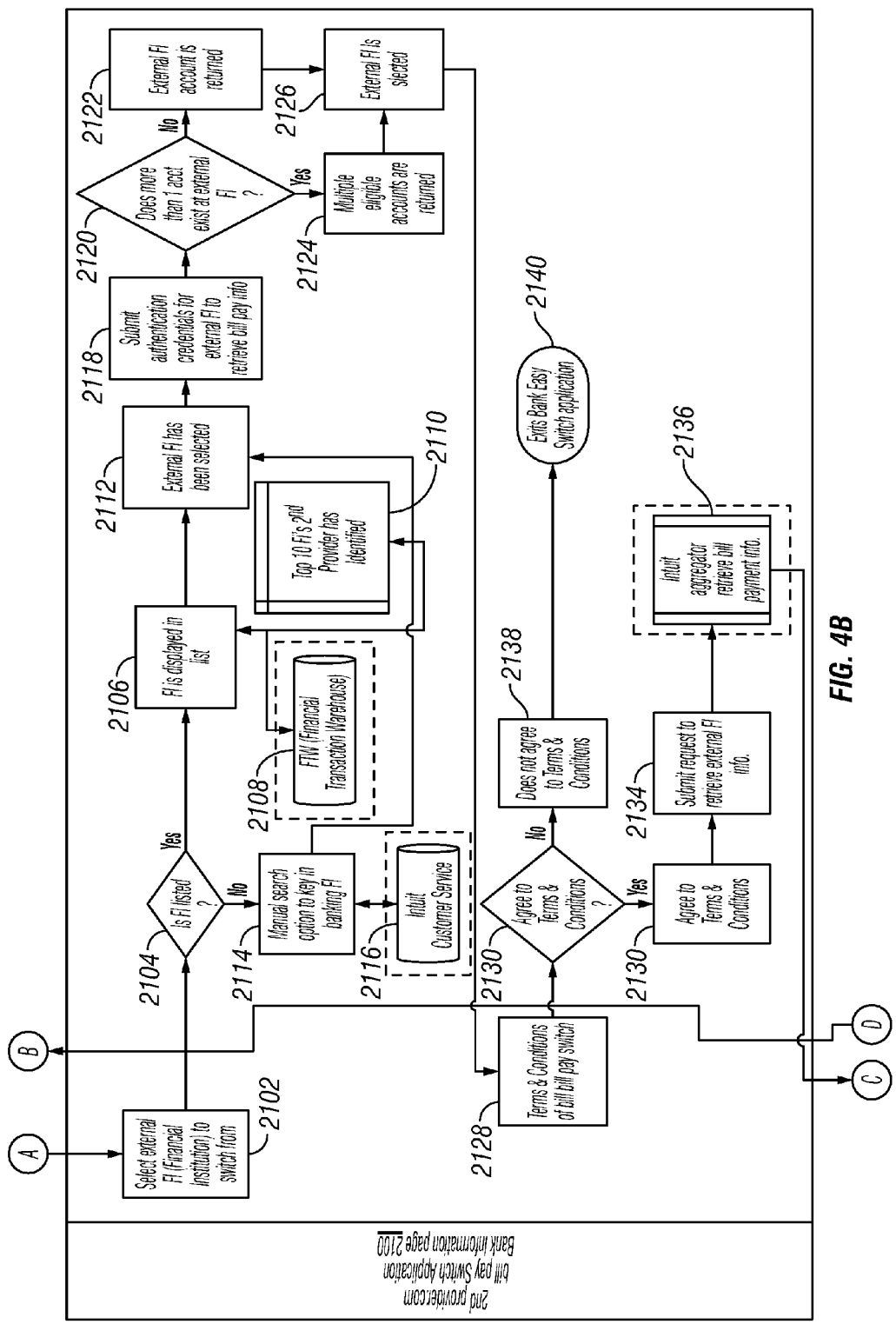
Figure 4C:
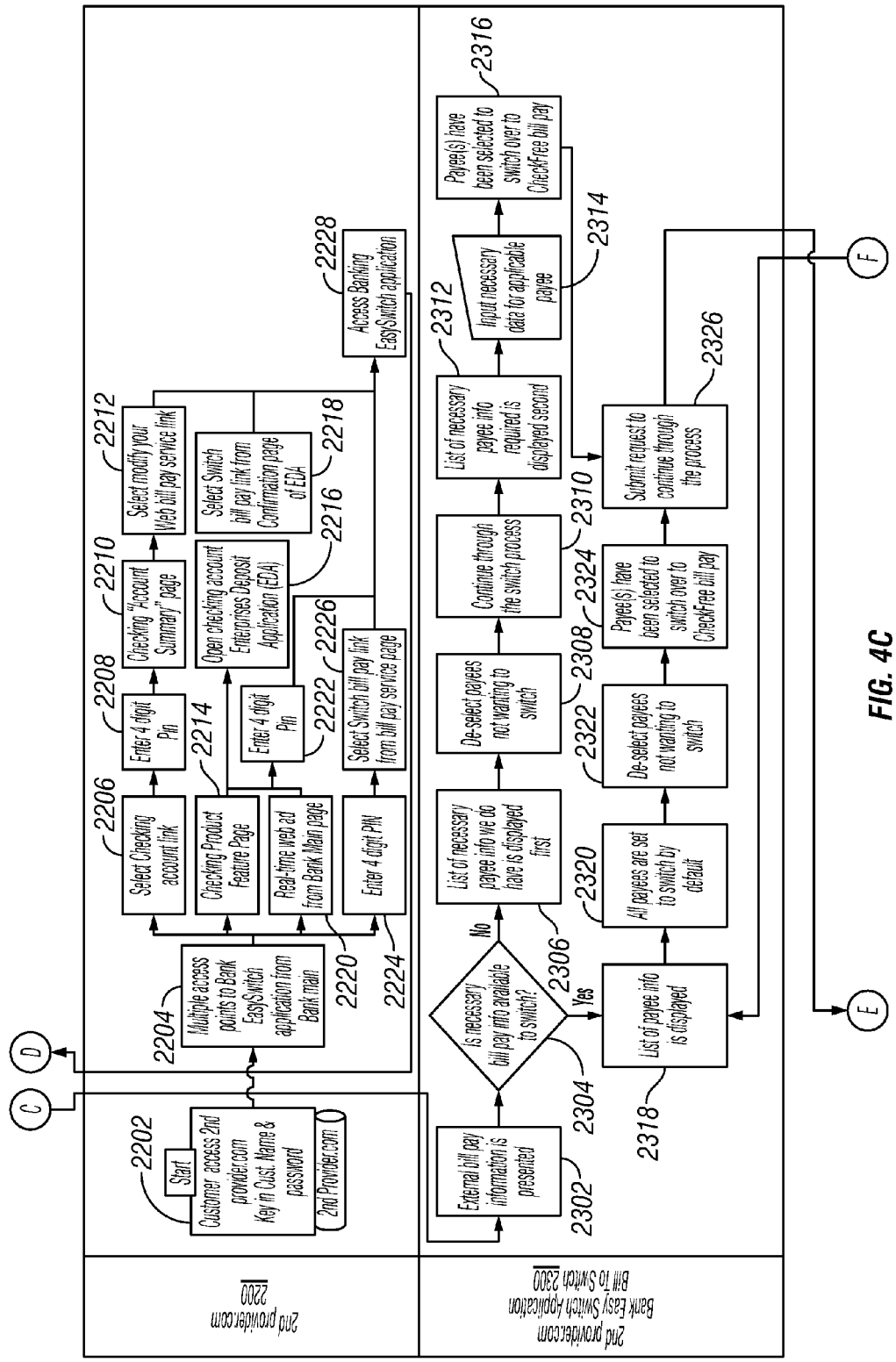
Figure 4D:
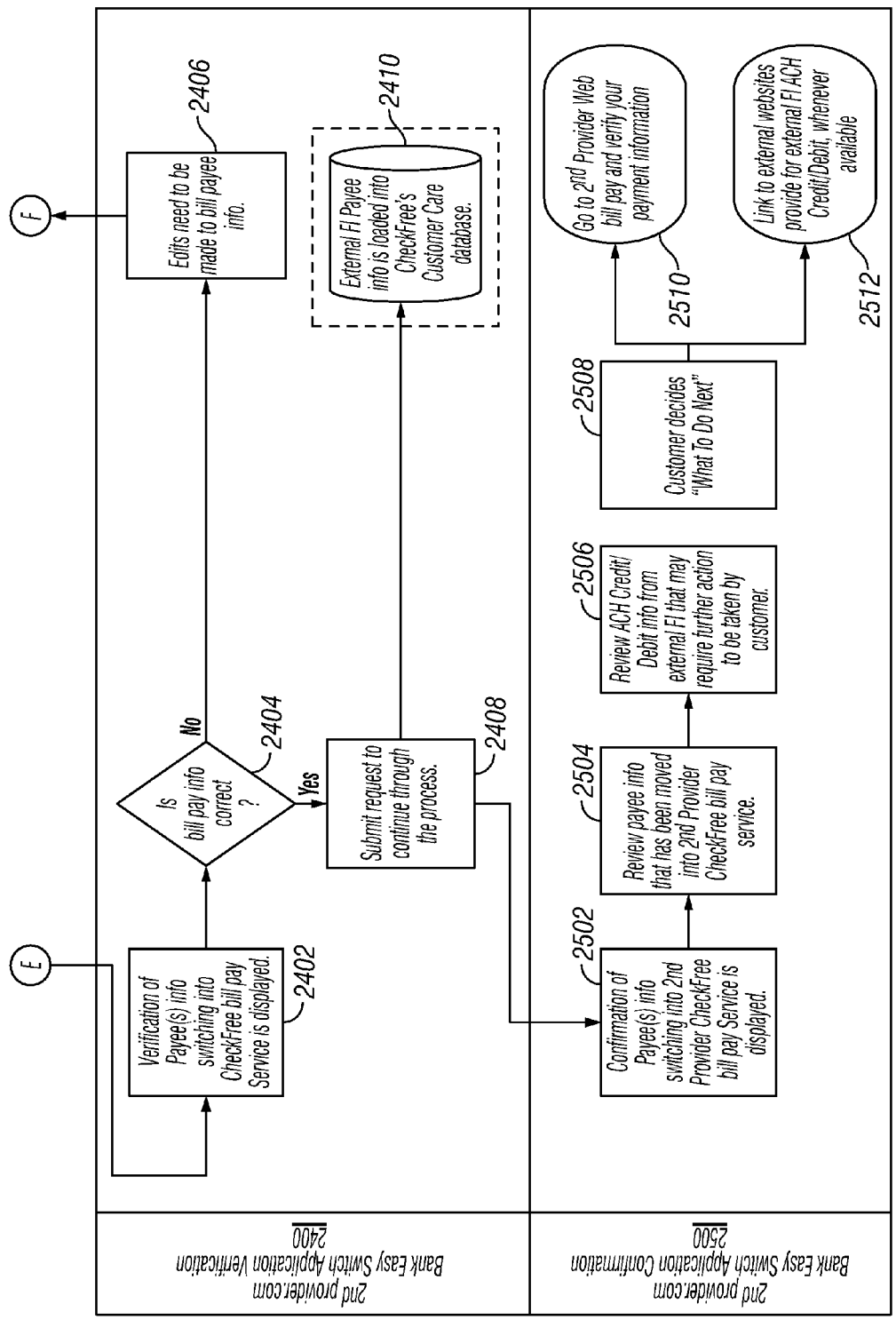

FIG. 3 is another exemplary schematic flowchart of another embodiment of the disclosure provided herein for transferring financial data from a first provider to a second provider. In general, the disclosure may provide for accessing an electronic system, such as online system provided by the second provider in Block 2000. The customer may choose an account or set up a new account and review terms and conditions in Block 2100 of the second provider. The customer may set up the account and various features in Block 2200. The customer may transfer electronic bill payments, such as through a Web site, in Block 2300, as well as recurring withdrawals, automatic deposits, or a combination thereof. The customer may verify the data selections in Block 2400 and confirm the acceptance and transfers as well as review the next block to complete the process in Block 2500.

FIG. 4 collectively represented by FIGS. 4A-4D and generally referenced herein as FIG. 4 is an exemplary expanded schematic flowchart of the general system and method illustrated in FIG. 3. For simplicity, each section of the detailed flowchart exemplified by the horizontal segmented portions illustrates details of the blocks designated in FIG. 3. For example, exemplary details of Block 2000 of FIG. 1 are shown in the segmented portion 2000 of FIG. 4, sheet 4A.

In Block 2000, shown in FIG. 3 and further illustrated in FIG. 4, the customer may access electronic systems, such as a Web site. More specifically, the customer may log on to the Web site or otherwise access the second provider interactive interface in Block 2002. The system may provide multiple access points for bill payment, automatic withdrawals, and/or automatic deposits in Block 2004. For example, the access points may include a bank account's main page in Block 2006, a bank account real time Web advertisement providing a link in Block 2008, a checking summary page in Block 2010, a bill payment hub page in Block 2012, and a switch kit page in Block 2014. In general, these various access points may direct the customer to a service of the second provider that may facilitate the switching and transfer of financial data from the first provider to the second provider on behalf of the customer. The service may provide the ability to switch electronic bill payments, automatic withdrawals, and/or automatic deposits in Block 2016. If the customer chooses such service, the system may direct the customer to a task entry Web page in Block 2018.

In Block 2100, shown in FIG. 3 and further illustrated in FIG. 4, the customer may choose the first provider account and review terms and conditions of the second provider to make the transfer and associated actions. More specifically, the customer may select an external financial institution as the "first provider" from which the customer may switch to the second provider in Block 2102. The customer may be asked to indicate whether the first provider is listed in Block 2104. If the first provider is displayed in a list in Block 2106, the customer may select the first provider in Block 2108. The first providers displayed in the list may be found from several places. For example, in Block 2108, the databases managed by the financial transaction warehouse (FTW) may be accessed by the second provider to provide a possible list to the customer. Further, the second provider may provide a list of the top frequency providers of such financial products, such as banking accounts from its own databases in Block 2110. Other sources of data may include Internet searches based upon the customer's locale and other identifying data, previous transactions with a customer if the customer is a present customer of the second provider, and other data. The customer may select the first provider, if available, from the list in Block 2112.

If the first provider is not displayed in the list, then the customer may be given a manual search option to enter the first provider name or other identifier in Block 2114. Based upon the entered data, one or more databases may be accessed in Block 2116 to provide data to connect to the first provider. Thus, either from the list or from manual entries, the first provider may be selected in Block 2112.

The customer may then submit an authentication customer credential to the first provider to retrieve the appropriate financial data in Block 2118. The system may be queried to determine whether the customer has more than one account with the first provider in Block 2120. If the answer is negative, then only the available account is returned as an option in Block 2122 for transferring the financial data of the customer. If multiple accounts are available as shown in Block 2124, then the customer may select one or more of the eligible accounts in Block 2126.

After the first provider and the particular account are selected, the customer may be referred to the terms and conditions screen in Block 2128 for review as provided by the second provider. The customer may be queried as to whether the customer agrees to the terms and conditions in Block 2130. If the customer agrees to the terms and conditions in Block 2132, the system may submit a request to retrieve the external financial data of the first provider in the account of the customer in Block 2134. If appropriate, an aggregator may retrieve bill payment data, automatic withdrawals, automatic deposits, or a combination thereof in Block 2136. After retrieving the financial data for the bill payments, deposits, or withdrawals, the system may be directed to present the data to the user in Block 2302 described below. If the customer does not agree to the terms and conditions in Block 2138, the program may exit the application and not switch the customer data from the first provider to the second provider in Block 2140.

In Block 2200, shown in FIG. 3 and further illustrated in FIG. 4, the customer may access the second provider account or set up a new account with the second provider. If the customer is not already logged onto the second provider system, the system may require additional logon data and various other data for the customer to access an already existing account to begin, complete, or change the functions of the account for bill payments, automatic deposit, automatic withdrawal, or some combination thereof. More specifically, the customer may access a second provider Web site or other communication medium in Block 2202. The customer may provide a user name and password, and other customer credentials. The system may provide multiple access points to the second provider application services to switch the financial data from the first provider to the second provider in Block 2204. As one exemplary access point, the customers may select a checking account link in Block 2206. The customer may be required to enter security data, such as four digit PIN in Block 2208. The customer may be provided a checking account summary page in Block 2210 and select or modify data for bill payments, automatic deposits, automatic withdrawals, or a combination thereof through a service link. Further, while a checking account is referenced herein, it is to be understood that such account may include savings accounts, money market accounts, and other appropriate financial products.

Another access point from Block 2204 may include a checking account product feature page in Block 2214 as may be shown to various customers on the second provider Web site. Generally, the customer may be browsing or otherwise reviewing various data. The customer may access the link and open an account in Block 2216, such as may be used as an enterprise deposit application (EDA). From that page, the customer may select the link to access the portion of the system that allows the transfer of financial data in Block 2218.

Another access point may include a Web page advertisement, such as from a main page of the second provider, in Block 2220. If the customer is an existing customer, the customer may be required to enter a PIN or other credential that may lead the customer to access the customer data transferring functions of the system in Block 2228. If the customer is not an existing customer in Block 2220, the system may direct the customer to open an account as described above in Block 2216.

Yet another access point may lead an existing customer directly to a link to enter a PIN or other customer credential in Block 2224. From such access, the customer may be directed to a transfer link service page in Block 2226 and thence to the portion on the system that allows the customer to access the transferring functions of the system as described above in Block 2228. From Block 2228, the customer may be directed to Block 2016 described above for further blocks in the transfer process.

In Block 2300, shown in FIG. 3 and further illustrated in FIG. 4, the customer may be directed to the overall block of transferring the bill payment, automatic withdrawal, automatic deposit, or other data as described above. More specifically, the customer may be presented with the bill payment data in Block 2302, such as from Block 2136 relating to bill payee data. The system may query whether the appropriate bill payment data is available to switch from the first provider to the second provider in Block 2304. If the data is not available, then the customer may be presented with a list of payee data or other data that the second provider currently has in Block 2306. Such data may be offered to the customer to deselect the particular payees or other parties that the customer does not want to switch in Block 2308. The customer may continue through the switch process in Block 2310 whereupon a list of payee data required is displayed in Block 2312. In Block 2314, the customer may be asked for input appropriate to supplement/complete the required data for the remaining payees to allow the requested transfer of data from the customer. The customer may then be presented with a list of payees selected to switch over to the second provider in Block 2316. If approved, the request may be sent to continue the process in Block 2326.

Returning to Block 2304, if the appropriate data is available to switch, then a list of the payee data may be displayed in Block 2318. By default, all identified payees with sufficient data to enable the switch may be set to transfer from the first provider to the second provider in Block 2320. However, the customer may deselect payees that the customer does not wish to switch in Block 2322. A revised list may be provided to the customer for review in Block 2324. If approved, the request is sent to continue the process in Block 2326 described above.

In Block 2400, shown in FIG. 3 and further illustrated in FIG. 4, the customer may verify the data and selections. More specifically, the customer may verify the list of payees for which the bill payments are to be switched from the first provider to the second provider in Block 2402. The customer may be asked to confirm whether the bill payment data is correct in Block 2404. If it is not correct, the customer may be directed to making edits appropriate in Block 2406. In some cases where perhaps edits are desired to the payee data, the system may redirect the customer back through the Block 2318 to provide input and other listings of suitable payees. If the bill payment data is correct in Block 2408, the customer may be directed to Block 2408 to submit their request to continue through the process.

In Block 2500, shown in FIG. 3 and further illustrated in FIG. 4, the customer may be queried to confirm the acceptance, make the transfers, and review the next blocks. More specifically, the customer may be asked to confirm the payee's data that is to be switched to the second provider in Block 2502. A display may be provided to the customer in Block 2504 that the customer may review for the data that has been moved into the customer account with the second provider. The customer may also review any ACH credit and debit data from the first provider that may require further action to be taken by the customer in Block 2506. In Block 2508, the customer may decide the next blocks to finalize the process. For example, in Block 2510, the customer may access the second provider account and particularly, the bill payment portion of the account, to confirm the payment data in Block 2510. Further, the customer may link to the Web site of the first provider, or even a third-party Web sites to provide for further completion of the transfer of financial data, accounts to be serviced, payments to be directed, and other features as may be appropriate in Block 2512.

While the present disclosure has described at times the financial product as being a bill payment transfer of financial data, it is to be understood and contemplated by the parties that such similar blocks may be made under the disclosure herein if the customer chose to include automatic withdrawals, automatic deposits, and other similar services that transfer assets between entities at the selection of the customer or upon an automatic basis.

The disclosure may integrate with an "aggregator" application, commercially available. In general, these aggregators are Java-based programs from such suppliers as Yodlee, Inc. of Redwood City, Calif., or Intuit of Mountain View, Calif. Such aggregator services generally are structured to gather data across a variety of sources using various protocols and combine the data. The data is made available to the particular application, such as in this case, the second provider. For example and without limitation, the aggregator may be used to access direct billers, credit cards, banking accounts, and loan data through a variety of protocols, such as OSX, ISX, QIF, XML, YML, HTML, manual entries, and customized entries. The data may be cleansed, normalized, and augmented as appropriate and then delivered to the application programming interface.

At a high level of discussion, the interface to the aggregator service supports the following use cases specific to the disclosure provided herein. One case is the "Logon" case where each customer is uniquely logged on to the aggregated service which may retrieve data from the bank, credit union, or other first providers on their behalf. A next case, a "Find Bank" case is used to allow the customer to have a means of locating their first providers by selecting from a list or by doing a keyword search. A "Get List of Accounts" case allows the customer to retrieve a list of accounts once the first provider has been identified. This block requires the customer to enter their bank Web site credentials to allow access to the customer data to be retrieved from the account of the first provider. The next cases are "Get Direct Withdrawal Transactions," "Get Direct Deposit Transactions," and "Get Web bill Pay Payee Details," that allow the customer to be able to view their direct withdrawals, direct deposits, and bill payment payee details after selecting a first provider and an account with the first provider.

Figure 5:
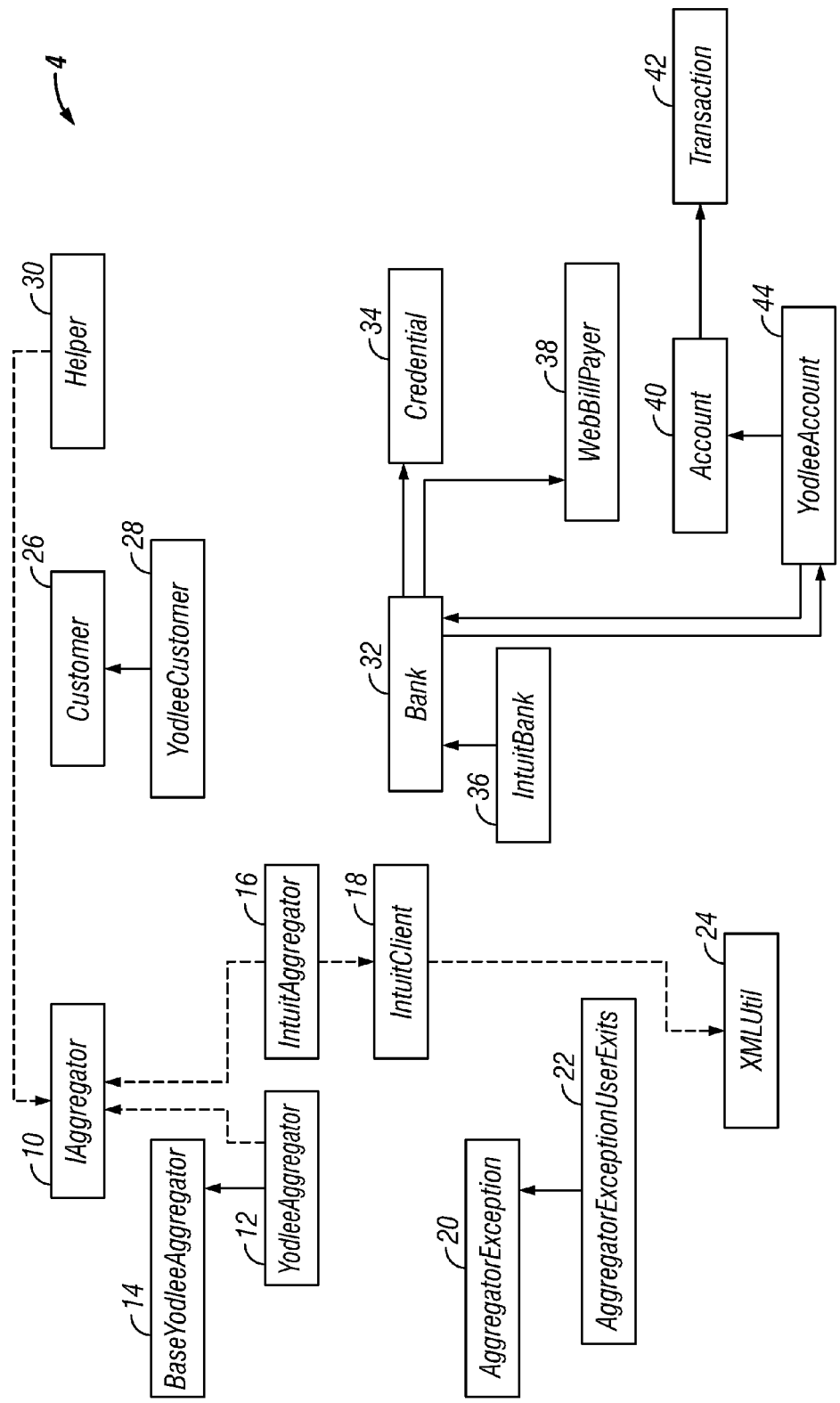
FIG. 5 is an exemplary Java-based class diagram that represents an extraction of common features found in various aggregators used to implement the use cases above.

FIG. 5 is an exemplary Java-based class diagram that represents an extraction of common features found in various aggregators used to implement the use cases above. Using this model, one with ordinary skill in the art may develop a user interface layer to code to an interface that may be implemented with the commercial aggregation services described herein. For example, one set of classes would be the IAggregator 10, YodleeAggregator 12, with the BaseYodleeAggregator 14, and an IntuitAggregator 16. This interface contains an abstract set of methods required to implement the specific use cases described above. Specific data of this class exists for each aggregator, allowing them to be interchanged in real time by the second provider. The aggregator may provide vendor specific implementations of this interface. The IntuitAggregator 16 class fully utilizes an IntuitClient 18 class and an XMLUtil 24 class to supplement its services. An AggregatorException 20 class may contain common exceptions used for all exceptions encountered with aggregation services. The XMLUtil 24 class includes a set of XML utility methods used to process XML responses from the Intuit service used in the IntuitClient 18 and IntuitAggregator 16. This class uses DOM and XPath expressions to parse out relevant pieces of data. The Customer 26 class may represent a customer of the second provider to which the transactions and other customer data are being transferred. It may also contain a partner of the second provider that may be interfacing with the second provider already and the customer. This class may be used during the aggregator log-in process. The YodleeCustomer 28 class may be used with the Customer 26 class and may provide some Yodlee specific requirements to the Customer class. The Helper 30 class may be used to provide the software to achieve a particular implementation of the aggregator interface. The Helper 30 class may also hold logic shared by a member of the Java server pages. The Bank 32 class may represent a bank or other financial institution from which the data is aggregated, that is, the first provider as used herein. The IntuitBank 36 class may add specific requirements to the Bank class. The Credential 34 class represents a customer credential to log-in to the bank or the financial institution. User names and passwords are examples of a customer credential. These credentials may be used to gain access to the first provider Web site or other data feed. The WebBillPay 38 class represents details about a particular payee that the customer set up at the first provider account's bill payment system used to pay bills automatically or by direction of the customer with at times additional input such as specific amounts. This data contains customer data to be retrieved from the first provider and transferred by the aggregator to the account of the customer with the second provider. The Account 40 class is an account at the first provider such as a checking or savings account. Once credentials in Credential 34 class are obtained, the aggregator may then access the first provider and retrieve a list of account of the first provider for a particular customer. The YodleeAccount 44 class adds Yodlee-specific requirements to the Account 40 class. The Transaction 42 class contains specific line item transactions for a specific account. For example, the aggregate services may return about 90 days of transaction history for a particular account from which the automatic withdrawals, automatic deposits, and bill payment data may be extracted. These classes may be used by the aggregator to implement the various blocks described herein such as log on, finding the bank, getting a list of accounts, getting customer data that includes direct withdrawal transactions, direct deposit transactions, and Web bill payee details, and other data.

Figure 6:
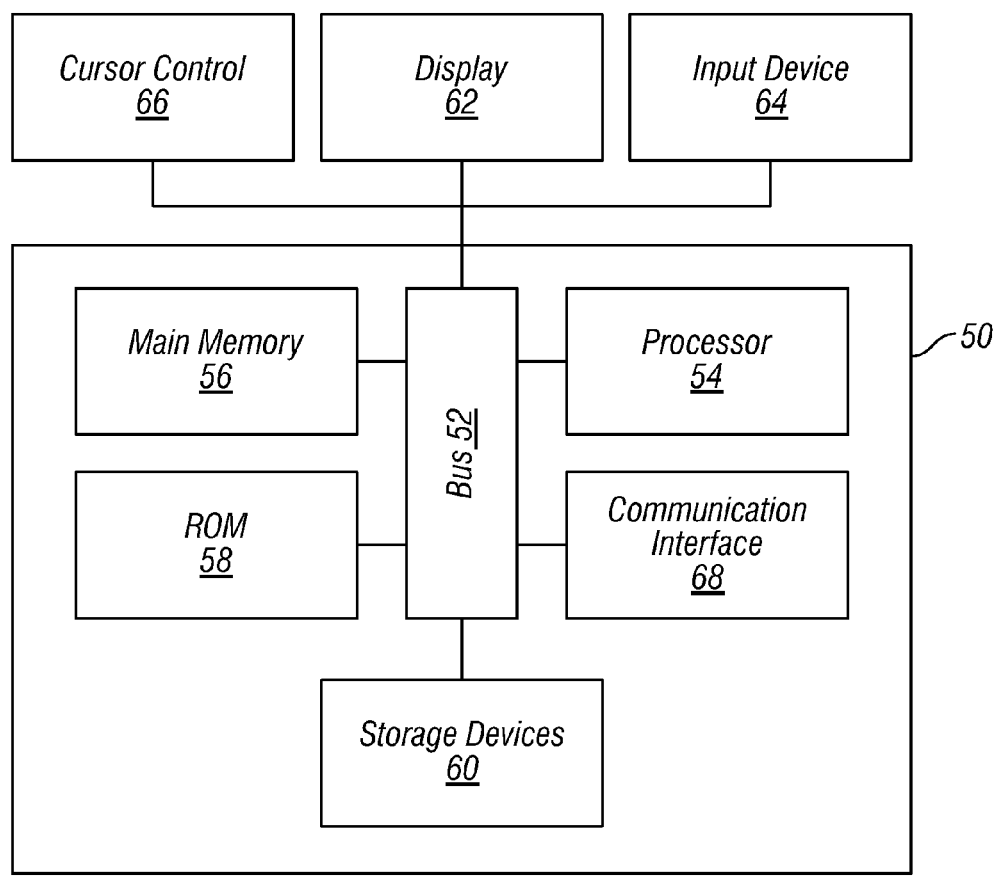
FIG. 6 is a schematic flowchart diagram of an exemplary system that may be used for various aspects of switching the provision of a financial product for a customer from a first provider of the financial product to a second provider, according to the disclosed embodiments.

FIG. 6 is a schematic flowchart diagram of an exemplary system that may be used for various aspects of switching the provision of a financial product for a customer from a first provider of the financial product to a second provider, according to the disclosed embodiments. As may be seen, in one embodiment, the system may include at least one server 50. Any suitable server 50 known to those having ordinary skill in the art may be used as part of the system, including a workstation, a Web server, a main frame, and the like. Such a server 50 typically includes a bus 52 or other communication mechanism for communicating data and a processor 54 coupled with the bus 52 for processing data. The server 50 may also include a main memory 56, such as a random access memory (RAM) or other dynamic storage device, coupled to the bus 52 for storing computer readable instructions to be executed by the processor 54. The main memory 56 may also be used for storing temporary variables or other intermediate data during execution of the instructions to be executed by the processor 54. The server 50 may further include a read only memory (ROM) 58 or other static storage device coupled to the bus 52 for storing static data and instructions for the processor 54. A computer readable storage device 60, such as a magnetic disk or optical disk, may be coupled to the bus 52 for storing data and instructions for the processor 54.

The server 50 may be coupled via the bus 52 to a display 62, such as a cathode ray tube (CRT), LCD monitor, or other display types for displaying data to a user. An input device 64, including, for example, alphanumeric and other keys, voice activated systems, screen touch systems and other input devices, might be coupled to the bus 52 for communicating data and command selections to the processor 54. Another type of user input device might be a cursor control 66, such as a mouse, a trackball, or cursor direction keys for communicating direction data and command selections to the processor 54, and for controlling cursor movement on the display 62. The cursor control 66 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 54 and/or other components. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as storage device 60. Volatile media may include dynamic memory, such as main memory 56. Transmission media may include coaxial cables, copper wire and fiber optics, including wires of the bus 52. Transmission may take the form of acoustic or light waves, such as those generated during radio frequency (RF) and infrared (IR) data communications. Common forms of computer readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer may read.

Various forms of the computer readable media may be involved in carrying one or more sequences of one or more instructions to the processor 54 for execution. For example, the instructions may initially be borne on a magnetic disk of a remote computer. The remote computer may load the instructions into its dynamic memory and send the instructions over a telephone line using a modem. A modem local to the system may receive the data on the telephone line and use an infrared transmitter to convert the data to an infrared signal. An infrared detector coupled to the bus 52 may receive the data carried in the infrared signal and place the data on the bus 52. The bus 52 carries the data to the main memory 56, from which the processor 54 retrieves and executes the instructions. The instructions received by the main memory 56 may optionally be stored on the storage device 60 either before or after execution by the processor 54.

The server 50 may also include a communication interface 68 coupled to the bus 52. The communication interface 68 typically provides a two-way data communication coupling between the server 50 and a network (not shown) such as the Internet, other servers, storage media, and the like. For example, the communication interface 68 may be an integrated services digital network (ISDN) card or a modem used to provide a data communication connection to a corresponding type of telephone line. As another example, the communication interface 68 may be a local area network (LAN) card used to provide a data communication connection to a compatible LAN. Wireless links may also be implemented. Regardless of the specific implementation, the main function of the communication interface 68 is to send and receive electrical, electromagnetic, optical, or other signals that carry digital data streams representing various types of data.

The invention has been described in the context of various embodiments and not every embodiment of the invention has been described. Apparent modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

The various methods and embodiments of the invention may be included in combination with each other to produce variations of the disclosed methods and embodiments, as would be understood by those with ordinary skill in the art, given the understanding provided herein. Also, various aspects of the embodiments may be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising," should be understood to imply the inclusion of at least the stated element or block or group of elements or blocks or equivalents thereof, and not the exclusion of a greater numerical quantity or any other element or block or group of elements or blocks or equivalents thereof. Discussion of singular elements may include plural elements and vice-versa. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and may further include without limitation integrally forming one functional member with another in a unity fashion. The coupling may occur in any direction, including rotationally.

The order of blocks may occur in a variety of sequences unless otherwise specifically limited. The various blocks described herein may be combined with other blocks, interlineated with the stated blocks, and/or split into multiple blocks. Additionally, the headings herein are for the convenience of the reader and are not intended to limit the scope of the invention. Other and further embodiments using one or more aspects of the inventions described above may be devised without departing from the spirit of Applicant's invention. For example, other means of communicating besides online Web site are envisioned such as through text messaging, voice responsive systems, and the like that provide interaction with the customer. Other variations are contemplated given the teachings of the disclosure herein.

Further, any references mentioned in the application for this patent as well as all references listed in the data disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicant(s).

What is claimed is:

1. A system for transferring financial data from a first provider to a second provider, comprising:
   a financial database disposed at a first provider and configured to store financial data associated with a customer, wherein said financial data comprises primary account holder data and electronic bill payment data associated with a set of electronic bill payment relationships between said customer and one or more payees;
   a computer memory; and
   a computer processor in communication with said computer memory, said computer processor operable to execute software modules, said software modules comprising:
      a transfer data aggregator configured to:
         retrieve a subset of said financial data on behalf of said customer from said financial database, wherein a customer-supplied credential is used to retrieve said subset of said financial data;
         search a plurality of data sources to locate customer data associated with said customer;
         retrieve said customer data on behalf of said customer, wherein said customer-supplied credential is not used to retrieve said customer data; and
         process said subset of said financial data and said customer data to generate a respective set of transfer data for each of said set of electronic bill payment relationships, wherein said respective set of transfer data includes recurring electronic bill payment dates corresponding to recurring electronic bill payments; and
      a bill pay switch module configured to:
         display, on a user device, a selectable list of potential first providers;
         receive a selection of said first provider from said selectable list of potential first providers;
         identify respective transfer data requirements for effectuating transfer of each of said set of electronic bill payment relationships from said first provider to said second provider;
         determine a subset of electronic bill payment relationships; and
         process said respective set of transfer data for each of said subset of electronic bill payment relationships to transfer each of said subset of electronic bill payment relationships from said first provider to said second provider in accordance with the transfer data requirements,
            wherein processing said respective set of transfer data for said each of said subset of electronic bill payment relationships includes scheduling, on behalf of said customer, said recurring electronic bill payments,
            wherein a payment date of each of said recurring electronic bill payments is dated a number of days after a recurring electronic bill payment date associated with each of said recurring electronic bill payments to give said customer time to validate payment status of said each of said recurring electronic bill payments.

2. The system of claim 1, wherein said selectable list of potential first providers is based on a location of said customer.

3. The system of claim 1, wherein an account is selected by said customer from a list of accounts, said list of accounts provided by said first provider.

4. The system of claim 1, wherein said customer data is aggregated from said plurality of data sources.

5. The system of claim 1, wherein said bill pay switch module is further configured to:
   identify said one or more payees associated with said set of electronic bill payment relationships from said financial data; and
   make a financial payment by said second provider to said one or more payees on behalf of said customer.

6. A computer-implemented method of transferring financial data from a first provider to a second provider, comprising:
   identifying, by a processor, a first provider having financial data associated with a customer, wherein said financial data comprises primary account holder data and electronic bill payment data associated with a set of electronic bill payment relationships between said customer and one or more payees,
      wherein identifying, by the processor, said first provider comprises:
         displaying, on a user device, a selectable list of potential first providers, and
         receiving a selection of said first provider from said selectable list of potential first providers;
   retrieving, by the processor, from a financial database disposed at said first provider, a subset of said financial data on behalf of said customer, wherein a customer-supplied credential is used to retrieve said subset of said financial data,
   searching a plurality of data sources to locate customer data associated with said customer;
   retrieving, by the processor, said customer data on behalf of said customer, wherein said customer-supplied credential is not used to retrieve said customer data;

aggregating, using the processor, said subset of said financial data and said customer data to generate a respective set of transfer data for each of said set of electronic bill payment relationships;

identifying, by the processor, respective transfer data requirements for effectuating transfer of each of said set of electronic bill payment relationships from said first provider to said second provider;

determining a subset of electronic bill payment relationships; and processing said respective set of transfer data for each of said subset of electronic bill payment relationships to transfer each of said subset of electronic bill payment relationships from said first provider to said second provider, wherein said respective set of transfer data includes recurring electronic bill payment dates corresponding to recurring electronic bill payments, wherein processing said respective set of transfer data for said each of said subset of electronic bill payment relationships includes scheduling, on behalf of said customer, said recurring electronic bill payments, wherein a payment date of each of said recurring electronic bill payments is dated a number of days after a recurring electronic bill payment date associated with each of said recurring electronic bill payments to give said customer time to validate payment status of said each of said recurring electronic bill payments.

7. The method of claim 6, wherein said selectable list of potential first providers is based on a location of said customer.

8. The method of claim 6, wherein an account is selected by said customer from a list of accounts, said list of accounts provided by said first provider.

9. The method of claim 6, wherein said customer data is aggregated from said plurality of data sources.

10. The method of claim 6, further comprising:
identifying, using the processor, said one or more payees associated with said set of electronic bill payment relationships from said financial data; and
making a financial payment by said second provider to said one or more payees on behalf of said customer.

11. The method of claim 6, further comprising:
presenting a list of said subset of electronic bill payment relationships for which electronic bill payment services are being provided by default through said second provider to said customer; and
receiving, by the processor, indication from said customer to deselect one of said subset of electronic bill payment relationships from said list so as to stop providing said electronic bill payment services according to said deselected one of said subset of electronic bill payment relationships through said second provider to said customer.

12. The method of claim 6, wherein said subset of electronic bill payment relationships is a first subset of electronic bill payment relationships, and further comprising:
determining, using the processor, a second subset of electronic bill payment relationships, wherein a portion of said respective transfer data requirements for each of said second subset of electronic bill payment relationships cannot be completed from said respective set of transfer data;
prompting said customer to complete said portion of said respective transfer data requirements for one of said second subset of electronic bill payment relationships; and after completion of said portion of said respective transfer data requirements for said one of said second subset of electronic bill payment relationships, adding said one of said second subset of electronic bill payment relationships to said first subset of electronic bill payment relationships.

13. The method of claim 6, wherein said financial data further comprises secondary account holder data, direct deposit data, and automatic withdrawal data.

14. The method of claim 6, further comprising:
generating pre-filled letters to notify one or more parties of said transfer of said financial data.

15. The method of claim 14, wherein said one or more parties comprises said first providers, a payee, and a vendor.

16. The method of claim 6, further comprising:
receiving an indication that said customer declines an offer from said second provider to generate pre-filled letters, said pre-filled letters for notifying one or more parties of said transfer of said financial data;
determining that said one or more parties requires notification of said transfer of said financial data; and
providing an indication to said customer that said customer is required to provide said notification to said one or more parties requiring said notification.

17. A non-transitory computer-readable medium comprising computer-readable instructions for transferring financial data of a customer from a first provider to a second provider, said computer-readable instructions comprising instructions for:
identifying a first provider having financial data associated with a customer, wherein said financial data comprises primary account holder data, secondary account holder data, and electronic bill payment data associated with a set of electronic bill payment relationships between said customer and one or more payees,
wherein said computer-readable instructions comprising instructions for
identifying said first provider further comprise instructions for:
displaying, on a user device, a selectable list of potential first providers, and
receiving a selection of said first provider from said selectable list of potential first providers;
retrieving a subset of said financial data on behalf of said customer, wherein a customer-supplied credential is used to retrieve said subset of said financial data;
searching a plurality of data sources to locate customer data associated with said customer;
retrieving said customer data on behalf of said customer, wherein said customer-supplied credential is not used to retrieve said customer data;
processing said subset of said financial data and said customer data to generate a respective set of transfer data for each of said set of electronic bill payment relationships, wherein said respective set of transfer data includes recurring electronic bill payment dates corresponding to recurring electronic bill payments;
identifying respective transfer data requirements for effectuating transfer of each of said set of electronic bill payment relationships from said first provider to said second provider;
determining a subset of electronic bill payment relationships; and
processing said respective set of transfer data for each of said subset of electronic bill payment relationships to transfer each of said subset of electronic bill payment relationships from said first provider to said second provider, wherein processing said respective set of transfer data for said each of said subset of electronic bill payment relationships includes scheduling, on behalf of said customer, said recurring electronic bill payments, wherein a payment date of each of said recurring electronic bill payments is dated a number of days after a recurring electronic bill payment date associated with each of said recurring electronic bill payments to give said customer time to validate payment status of said each of said recurring electronic bill payments.

18. The non-transitory computer-readable medium of claim 17, wherein said selectable list of potential first providers is based on a location of said customer.

19. The non-transitory computer-readable medium of claim 17, wherein an account is selected by said customer from a list of accounts, said list of accounts provided by said first provider.

20. The non-transitory computer-readable medium of claim 17, wherein said customer data is aggregated from said plurality of data sources.

21. The non-transitory computer-readable medium of claim 17, further comprising:

identifying said one or more payees associated with said set of electronic bill payment relationships from said financial data; and making a financial payment by said second provider to said one or more payees on behalf of said customer.

* * * * *